(12) United States Patent
Fan

(10) Patent No.: US 7,386,135 B2
(45) Date of Patent: Jun. 10, 2008

(54) CARDIOID BEAM WITH A DESIRED NULL BASED ACOUSTIC DEVICES, SYSTEMS AND METHODS

(76) Inventor: Dashen Fan, 14714 SE. 49th St., Bellevue, WA (US) 98006

( * ) Notice: Subject to any disclaimer, the term of this patent is extended or adjusted under 35 U.S.C. 154(b) by 897 days.

(21) Appl. No.: 10/206,242

(22) Filed: Jul. 26, 2002

(65) Prior Publication Data

US 2005/0074129 A1 Apr. 7, 2005

Related U.S. Application Data

(60) Provisional application No. 60/309,462, filed on Aug. 1, 2001.

(51) Int. Cl.
H04R 3/00 (2006.01)
H04R 29/00 (2006.01)
H03B 29/00 (2006.01)
H04B 15/00 (2006.01)

(52) U.S. Cl. .................. 381/92; 381/111; 381/122; 381/71.1; 381/56; 381/94.1; 381/71.11; 381/94.7

(58) Field of Classification Search .................. 381/92, 381/56, 111, 122, 71.1, 94.1–94.9
See application file for complete search history.

(56) References Cited

U.S. PATENT DOCUMENTS

| | | | |
|---|---|---|---|
| 4,653,102 A | 3/1987 | Hansen | |
| 4,888,807 A | 12/1989 | Reichel | |
| 5,471,538 A * | 11/1995 | Sasaki et al. | 381/92 |
| 5,473,701 A | 12/1995 | Cezanne et al. | |
| 5,530,762 A * | 6/1996 | Jones et al. | 381/63 |
| 5,694,474 A * | 12/1997 | Ngo et al. | 381/66 |
| 6,741,714 B2 * | 5/2004 | Jensen | 381/313 |
| 6,928,171 B2 * | 8/2005 | Leber | 381/94.1 |
| 7,116,792 B1 * | 10/2006 | Taenzer et al. | 381/313 |

* cited by examiner

*Primary Examiner*—Vivian Chin
*Assistant Examiner*—Devona E Faulk
(74) *Attorney, Agent, or Firm*—Peloquin, PLLC; Mark S. Peloquin, Esq.

(57) ABSTRACT

An acoustic device is provided with first and second one or more acoustic elements to generate a first signal that includes mostly undesired audio and substantially void of desired audio, and a second signal that includes desired as well undesired audio respectively. The first one or more acoustic elements are designed and arranged to generate a Cardioid beam with a null at an originating direction of the desired audio. The second one or more acoustic elements are designed and arranged to generate a complementary beam that includes the desired audio. A system is provided with an appropriate signal processing logic to recover the desired audio using the first and second signals. The signal processing logic may practice echo cancellation like techniques or blind signal separation techniques.

3 Claims, 22 Drawing Sheets

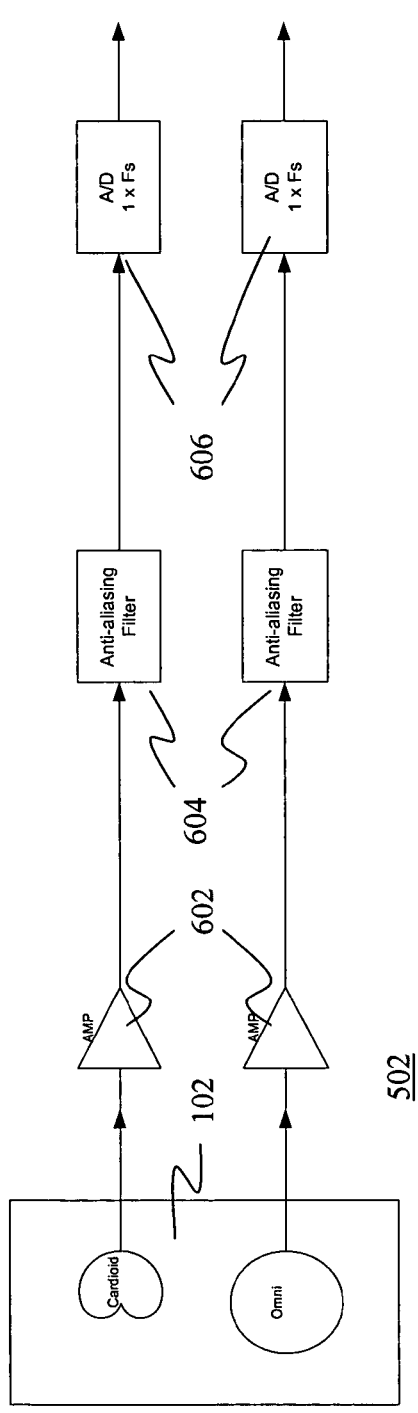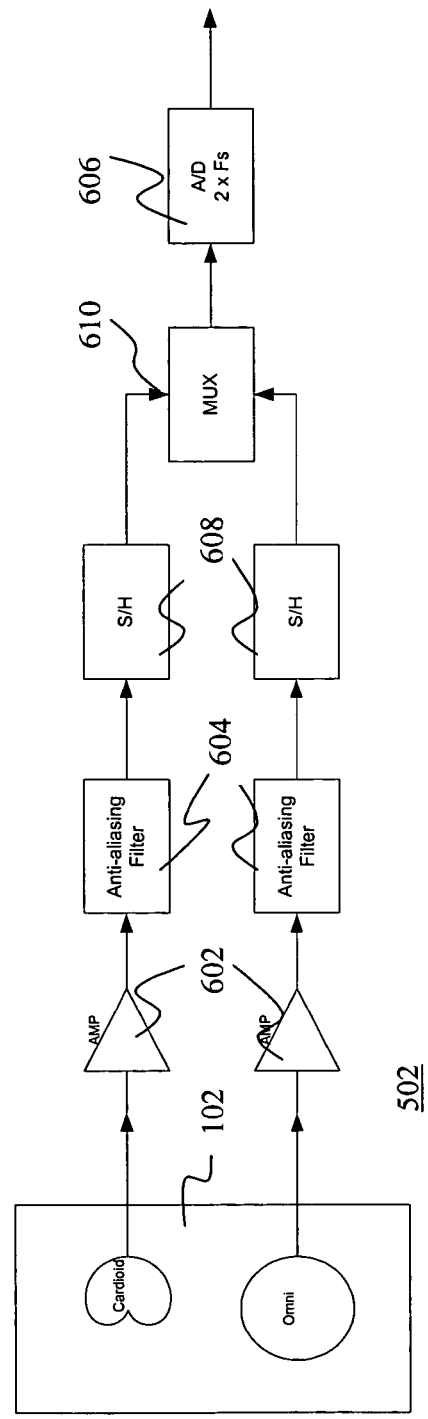
Figure 6a
Figure 6b

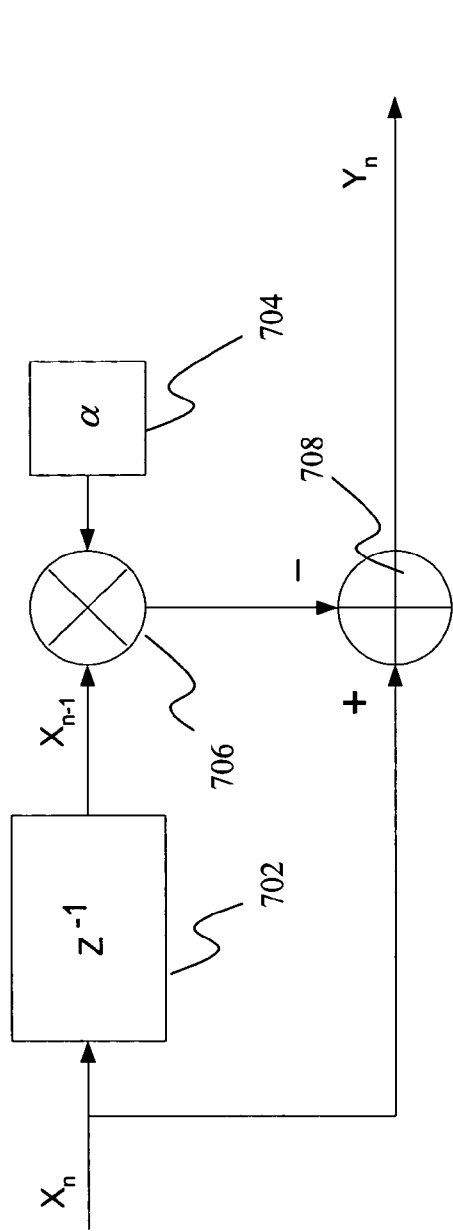
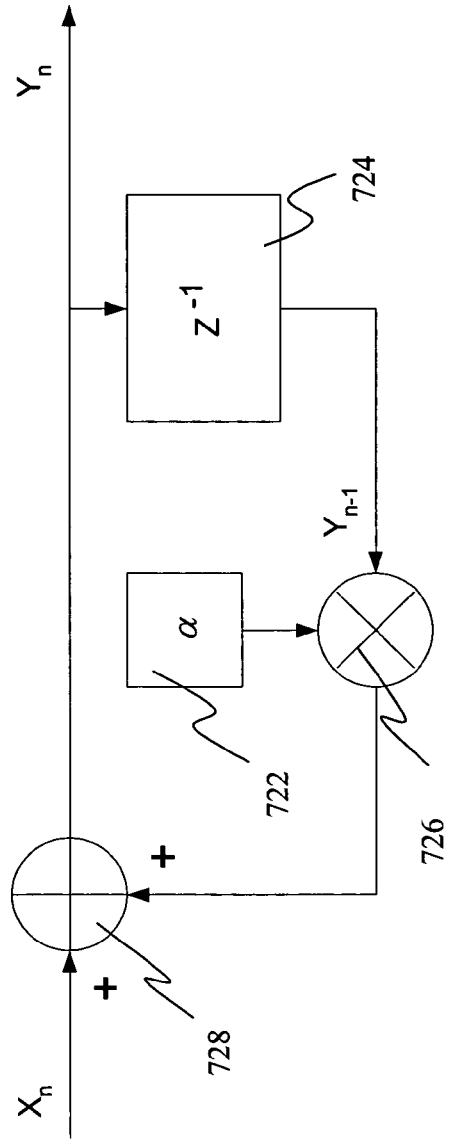
504
Figure 7a
508
Figure 7b

CARDIOID BEAM WITH A DESIRED NULL BASED ACOUSTIC DEVICES, SYSTEMS AND METHODS

RELATED APPLICATION

The present invention is related to and claims priority to provisional application No. 60/309,462 entitled "Adaptive Noise Cancellation System", filed on Aug. 1, 2001, which specification is hereby fully incorporated by reference.

FIELD OF THE INVENTION

The present invention relates to the fields of acoustics and signal processing. More specifically, the present invention is related to audio devices, systems and methods for sensing and/or discerning desired audio in a noisy environment, where the environmental noises are statistically uncorrelated to the desired audio, and located at the directions other than the direction of the desired audio.

BACKGROUND OF THE INVENTION

Interference from background noises is one of the main barriers to advance acoustic applications or systems, whether it is audio acquiring microphone systems for communication or automatic speech recognition (ASR), hydrophone systems, sonar systems, or other acoustic systems of the like. The problem has found to be especially difficult with multiple background noise sources that are non-stationary, broadband, bursting and intermittent in a reverberant environment.

For example, in the case of ASR systems, it is increasingly desirable to introduce ASR technology to the large number of mobile communication devices, such as cell phones, car phones, and PDA, recently deployed as a result of the recent rapid advances in mobile communication and related technologies. However, most of these devices are frequently operated in a relatively noisy acoustic environment, such as on the street, in a car, bus, subway, train or airplane, or inside a noisy mall, factory or office. The background noises of these reverberant environments often exhibit the earlier mentioned non-stationary, broadband, bursting and intermittent characteristics. Resultantly, new applications utilizing speech recognition interface, whether for dictation or command-and-control, remain scarce.

To overcome these kinds of noise problems, others have resorted to close-talk handset, headset, or ear-set devices. However, these solutions introduce a number of inconveniences for the users. The wires of these additional headset/ear-set devices are often tangled with other objects. Wireless alternatives are more user friendly, however, they themselves have other limitations and inconveniences, e.g., higher cost. Multi-microphone arrays may avoid some of these limitations, however prior art multi-microphone arrays tend to be physically large, and unsuitable for most applications.

Consequently, there is a need for a more effective solution, especially one that is more compact that can allow a more natural human-machine interface that is hands-free, headset-free, and most importantly noise-free, for certain acoustic applications, such as ASR. In addition, noise reduction and/or cancellation preferably not only increase the clarity and intelligibility of the desired audio, but the reduction/cancellation may perhaps even reduce the load of digital communication networks, thereby resulting in more effective use of their capacities.

Other applications include noise robust headphone, teleconferencing system, digital voice recorder and hearing aid, etc.

BRIEF DESCRIPTION OF THE DRAWINGS

The present invention will be described by way of exemplary embodiments, but not limitations, illustrated in the accompanying drawings in which like references denote similar elements, and in which:

FIGS. 6a-6b illustrate the sampling component of FIG. 5 in further detail, in accordance with one embodiment;

FIGS. 7a-7b illustrate a pre-whitening and a de-whitening component suitable for use as the optional signal conditioning and re-conditioning components of FIG. 5 for certain acoustic applications, in accordance with one embodiment;

SUMMARY OF THE INVENTION

Figure 1:
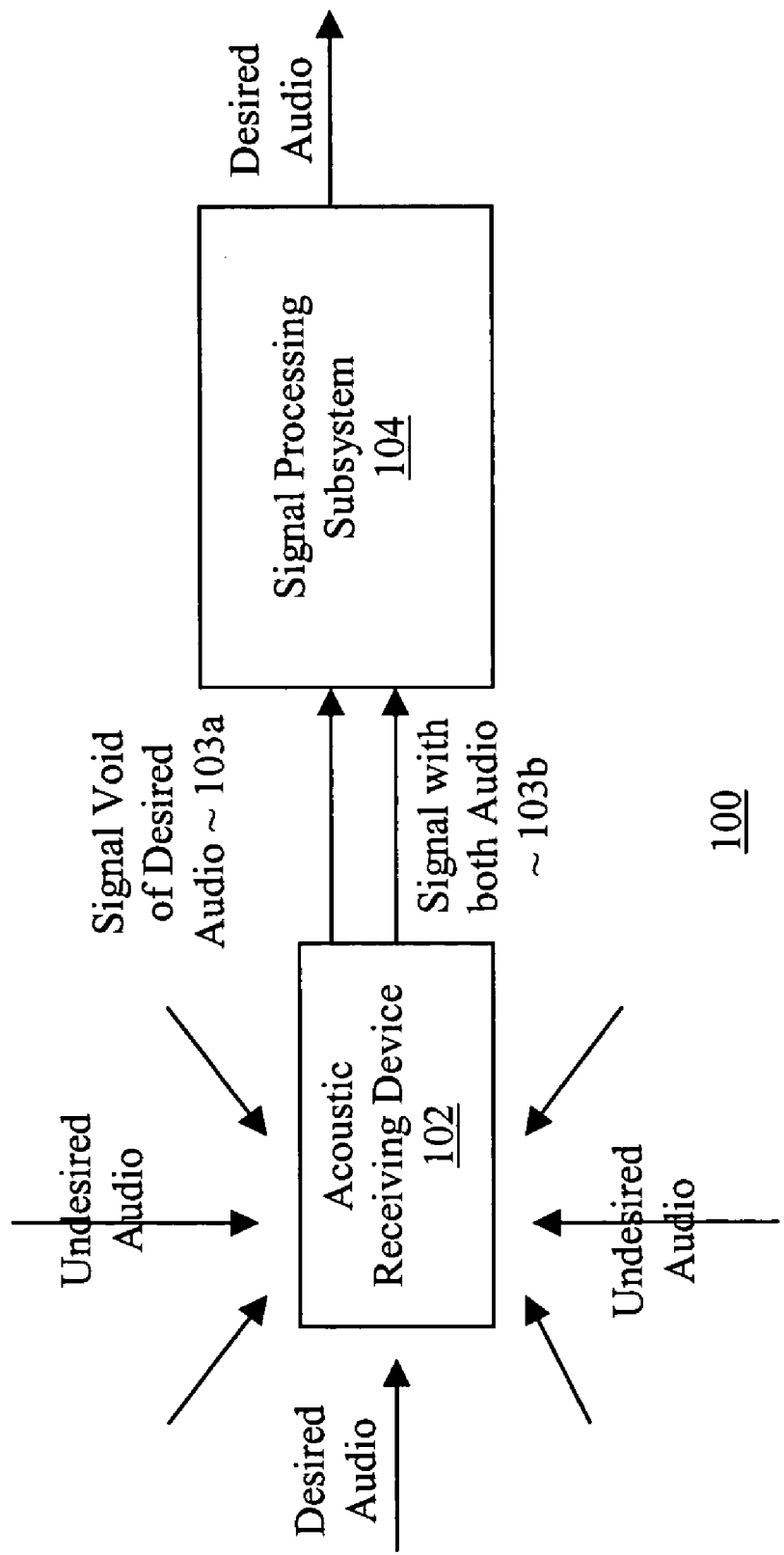
FIG. 1 illustrates an overview of the present invention, in accordance with one embodiment.

Briefly, the present invention includes acoustic devices, systems and methods.

In accordance with one aspect, an acoustic device is formed with first and second plurality of one or more acoustic elements. The first plurality of one or more acoustic elements are designed and arranged to facilitate generation of a first signal that includes mostly undesired audio, substantially void of desired audio. The second plurality of one or more acoustic elements are designed and arranged to facilitate generation of a second signal that includes both the desired and undesired audio.

In one embodiment, the first one or more elements, in response to the presence of audio, desired or undesired, output a cardioid shaped acoustic beam with a null at the originating direction of the desired audio. The second one or more elements output an audio beam shaped in one of a number of complementary manner to encompass or maximizing the desired audio.

In accordance with another aspect, a signal processing subsystem is provided to extract the desired audio, using the two signals.

In various embodiments, the signal processing subsystems may practice various echo cancellation like signal extraction techniques, by introducing deterministic delays to the second signal, or practice blind signal separation techniques.

In various echo cancellation like signal extraction embodiments, pre-whitening and de-whitening components may be provided to condition and re-condition signals.

In one embodiment, the desired audio is speech, in particular, speech to be recognized in a noisy reverberant environment, where noise is stochastic and uncorrelated to the desired speech, such as in an automobile or in an office.

DETAILED DESCRIPTION OF EMBODIMENTS

In the following description, various embodiments of the present invention will be described, in particular, ASR oriented embodiments. However, from the descriptions to follow, those skilled in the art would appreciate that the present invention is not limited to ASR only. The present invention may be practiced in other acoustic applications, including but are not limited to communication devices, recording devices, hearing aids, as well as hydrophones and sonar.

For purposes of explanation, specific numbers, materials and configurations are set forth in order to provide a thorough understanding of the present invention. However, it will be apparent to those skilled in the art that the present invention may be practiced with only some of these details, and/or with other elements. In other instances, well-known features are omitted or simplified.

Terminology

Parts of the description will be presented in acoustic and signal processing terms, such as acoustic beams, impulse, response, sampling, signal conditioning, signal extractions and so forth, consistent with the manner commonly employed by those skilled in the art to convey the substance of their work to others skilled in the art. As well understood by those skilled in the art, even in software implementations of some of the aspects of the present invention, these quantities take the form of electrical, magnetic, or optical signals capable of being stored, transferred, combined, and otherwise manipulated through electrical and/or optical components of a processor and its subsystems.

Part of the descriptions will employ various abbreviations, including but are not limited to:

| | |
|---|---|
| ASR | Automatic Speech Recognition |
| BSS | Blind Signal Separation or Blind Source Separation |
| FFT | Fast Fourier Transform |
| FIR | Feedback Impulse Response |
| IFFT | Inverse Fast Fourier Transform |
| LMS | Least Mean Square |
| NLMS | Normalized Least Mean Square |

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having", "including" and other constructs of the like, are synonymous, unless the context dictates otherwise.

Overview

We refer now to FIG. 1, wherein a block diagram illustrating an overview of an acoustic system of the present invention, in accordance with one embodiment. As illustrated, for the embodiment, acoustic system 100 includes acoustic device 102 and signal processing subsystem 104, both incorporated with the teachings of the present invention. The two elements are coupled to each other as shown.

Acoustic device 102, in accordance with the present invention, is designed to respond to audio presence, desired and undesired (i.e. noise), by outputting two audio beams 103a and 103b, with audio beam 103a having mostly undesired audio, substantially void of desired audio, and audio beam 103b having both the desired and the undesired audio.

The two acoustic beams (hereinafter, simply beams) are sampled by signal processing subsystem 104 to generate two corresponding audio signals (hereinafter, simply signals), which in turn are used by signal processing subsystem 104 to recover the desired audio, by removing the first signal corresponding to the first beam from the second signal corresponding to the second beam.

As will be appreciated by those skilled in the art, based on the descriptions to follow, acoustic device 102 may be formed compactly using as little as two acoustic elements, one each for the corresponding responsive generation of one of the two beams. Resultantly, the present invention is able to provide a more compact and user-friendly human interface for acoustic applications that have to address the issue of recovering desired audio from a complex noisy environment, such as in many ASR applications.

Further, under the present invention, audio beam 103a may be generated by an element with Cardioid beam pattern, which has considerable sensitivity in all directions except the desired audio direction in space. Resultantly, unlike the prior arts where there are some "blind spot" directions with incomplete noise cancellation, the present invention may cancel noise coming from virtually any one of a number of directions.

Acoustic Device

As alluded to earlier, acoustic device 102 may be formed compactly using as few as two acoustic elements. FIGS. 2a-2g illustrate a number of these embodiments, from the perspective of the audio beams formed. However, the present invention is not so limited. In alternate embodiments, two or more acoustic elements may be used to responsively generate beams 103a and 103b instead. For ease of understanding, the description will primarily be presented in the context of the various two elements embodiments. Moreover, acoustic device 102 will simply be referred to as "microphone".

Figure 2A:
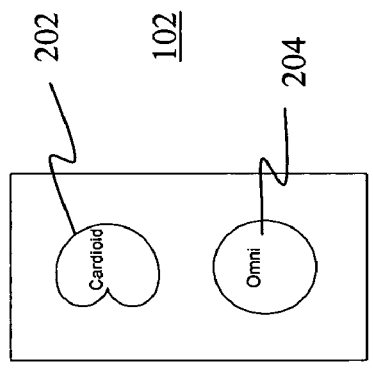
FIGS. 2a-2g illustrates beam forming of the acoustic device of FIG. 1 in further detail, in accordance with various embodiments.
Figure 2A:
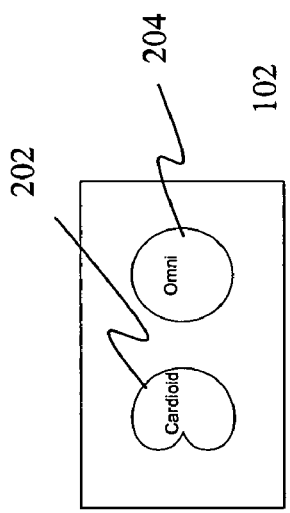
Figure 2A:
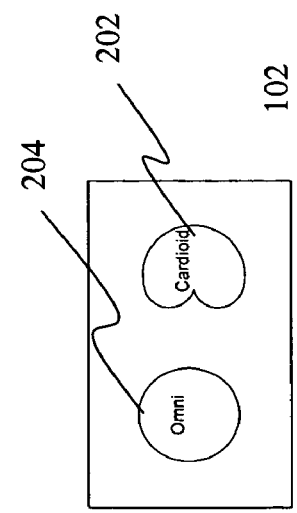
Figure 2A:
Figure 2B:
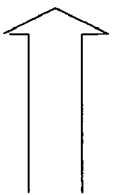
Figure 2C:
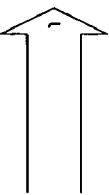

FIGS. 2a-2c illustrate three two-element embodiments, where one element 202 in response to the presence of audio generates a cardioid beam and the other element 204, in response to the presence of audio generates an omni directional beam. In each of these embodiments, cardioid beam generating acoustic element (hereinafter, simply "mic") 202, is arranged with the null of the cardioid mic facing the expected originating direction of desired audio.

For the embodiment of FIG. 2a, omni-directional beam generating mic 204 is arranged to face the expected originating direction of desired audio in parallel with cardioid beam generating mic 202. For each of the embodiments of FIG. 2b-2c, omni-directional beam generating mic 204 is arranged to face the expected originating direction of desired audio in series with cardioid beam generating mic 202. For the embodiment of FIG. 2b, omni-directional beam generating mic 204 is arranged to be disposed "behind" cardioid beam generating mic 202. For the embodiment of FIG. 2c, omni-directional beam generating mic 204 is arranged to be disposed "in front of" cardioid beam generating mic 202 (both viewed from the perspective of the expected originating direction of the desired audio).

Figure 4A:
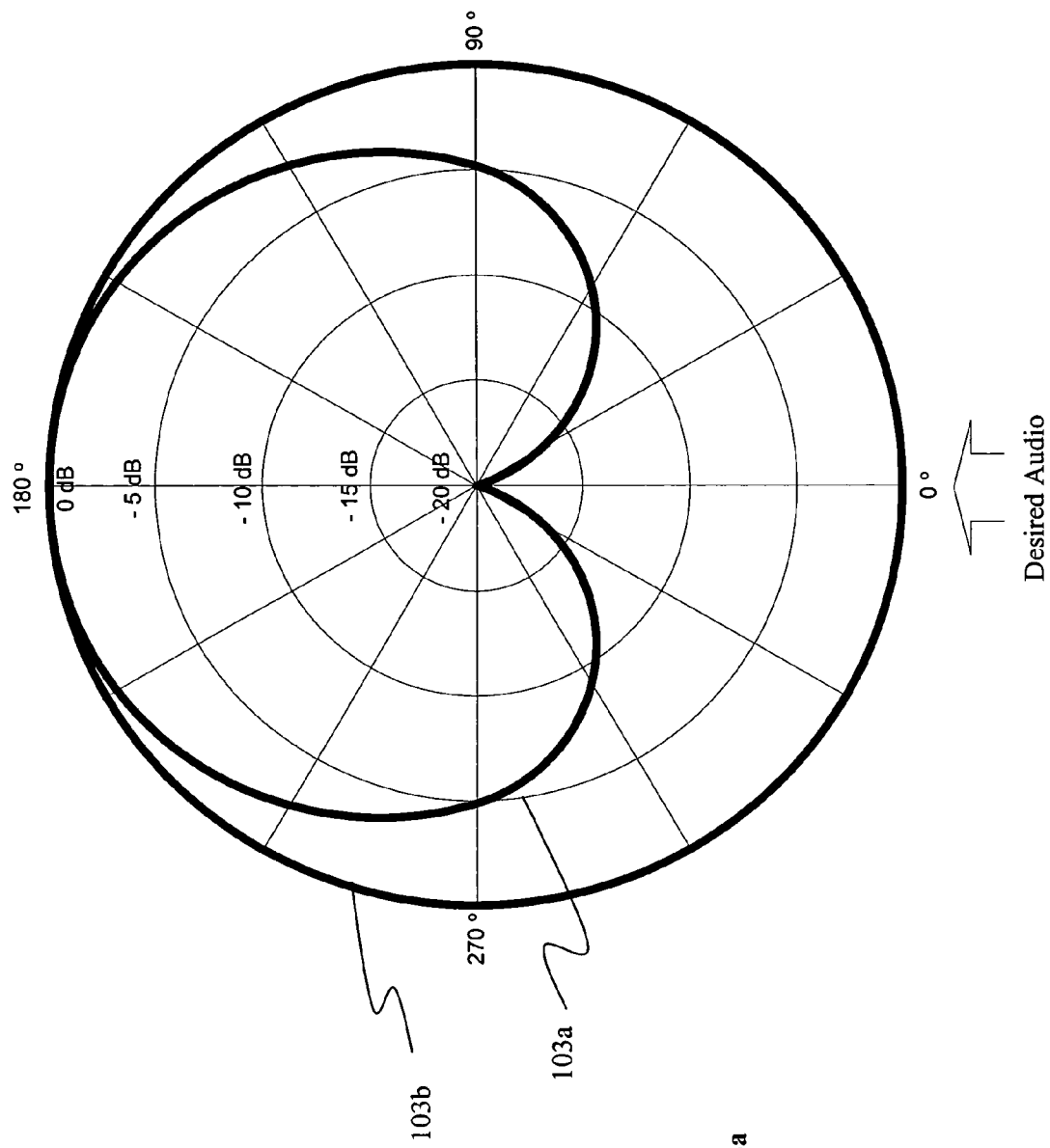
FIG. 4a illustrates the acoustic beams generated by the various acoustic devices of FIG. 2a-2c, and FIG. 2g (when supplemented with the circuitry of FIG. 3) in the form of a polar sensitivity plots

FIG. 4a illustrates the corresponding acoustic beams 103a and 103b (in the form of a "polar sensitivity" plot) responsively generated by elements 202 and 204 of the arrangements of FIGS. 2a-2c. As described earlier, beam 103a comprises a null facing in the originating direction of desired audio. For these embodiments, beam 103b "radiates" in all directions, and does not contain any null.

The null of cardioid beam generating element 202 is an attempt to eliminate the leakage of desired acoustic into beam 103a. In reality, the null can often achieve as much as −20 dB attenuation relative to the sensitivity at the opposite direction. Nevertheless, experience has shown that the present invention still exhibits consistent improved results over that of the prior arts.

Typically, the two acoustic elements are disposed proximally adjacent to each other to enable the desired compact human interface be formed (for certain applications). For these applications, the separating distance between two discrete mic elements may be in the range as small as 0.2 cm to 1 cm. For semiconductor acoustic devices, the separating distance may be in the order of microns or even submicrons. While care should be exercised to reduce the likelihood of cross interference between the elements, as illustrated by FIG. 2a-2c, their relative dispositions, i.e. whether facing the expected originating direction of desired audio in parallel or in series, are not as important as their respective beam patterns.

Figure 2D:
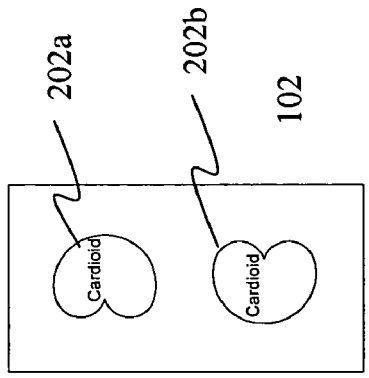
Figure 2E:
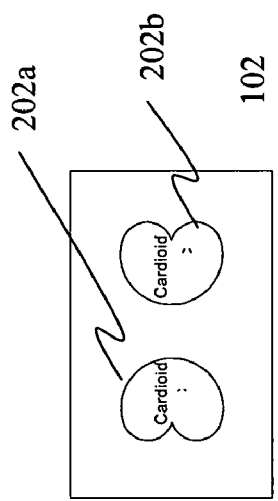
Figure 2F:
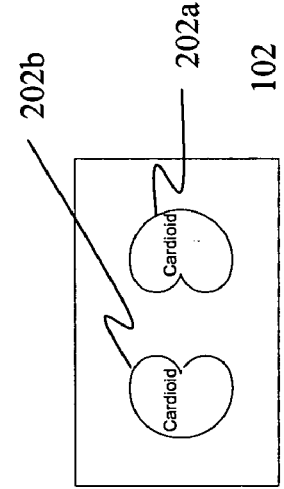

FIGS. 2d-2f illustrate three alternate two-element embodiments, where both elements are cardioid beam generating mics 202a-202b. In each of these embodiments, one of the two cardioid beam generating mics 202a is arranged with its null facing the expected originating direction of desired audio, and the other cardioid beam generating mic 202b arranged with its null facing away from the expected originating direction of desired audio.

For the embodiment of FIG. 2d, the other cardioid beam generating mic 202b is arranged to have its null face away from the expected originating direction of desired audio, in parallel with the first cardioid beam generating mic 202a. Similarly, for each of the embodiments of FIG. 2e-2f, the other cardioid beam generating mic 202b is also arranged with its null to face away from the expected originating direction of desired audio, except in series with the first cardioid beam generating mic 202a.

For the embodiment of FIG. 2e, the other cardioid beam generating mic 202b is arranged to be disposed "behind" the first cardioid beam generating mic 202a, whereas for the embodiment of FIG. 2f, the other cardioid beam generating mic 202b is arranged to be disposed "in front of" the first cardioid beam generating mic 202a (both viewed from the perspective of the expected originating direction of the desired audio).

Figure 4B:
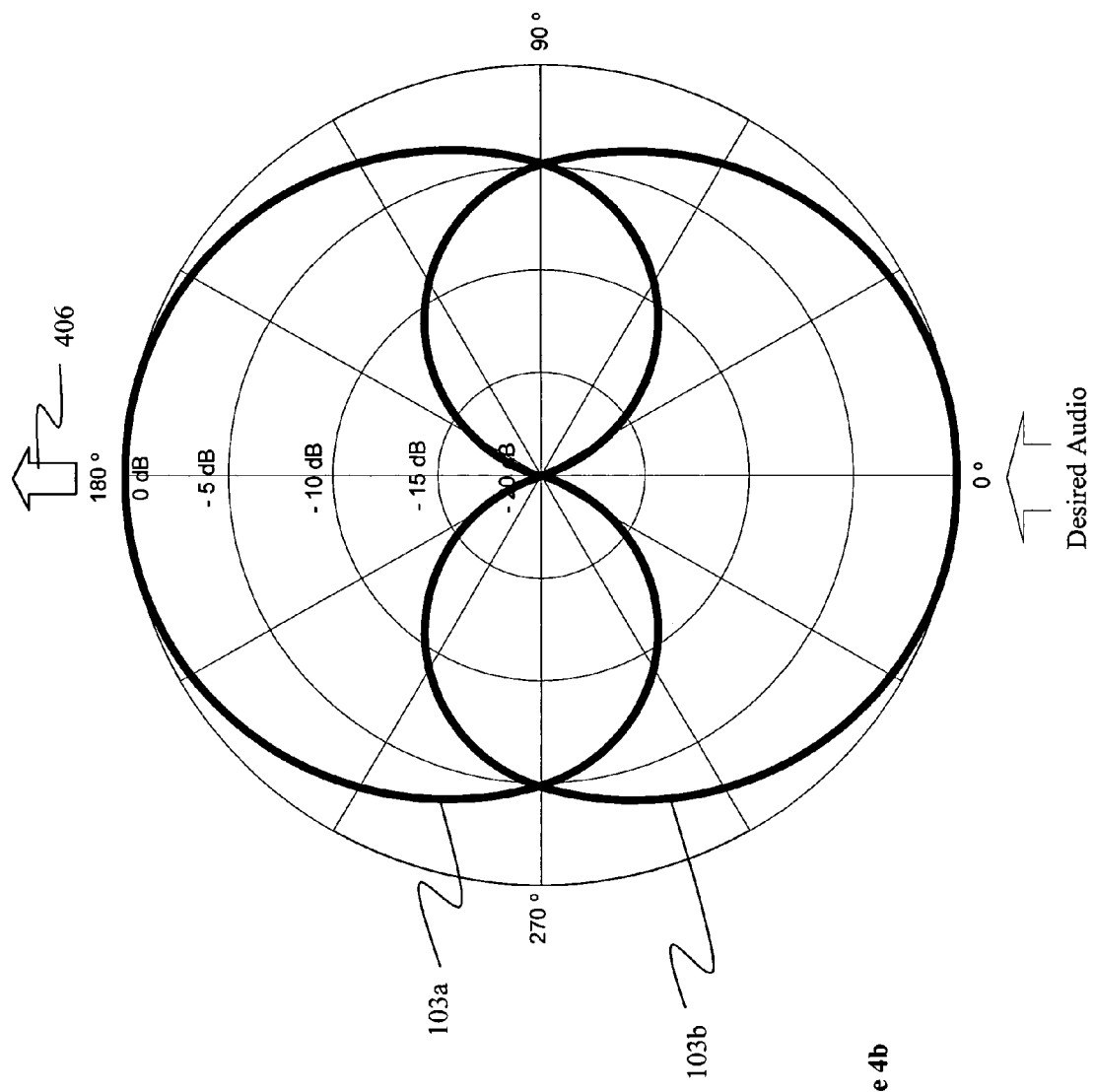
FIG. 4b illustrates the acoustic beams of FIG. 2d-2f in the form of a polar sensitivity plot.

FIG. 4b illustrates the corresponding acoustic beams 103a and 103b (also in the form of a "polar sensitivity" plot) responsive generated by elements 202a and 202b of the arrangements of FIGS. 2d-2f. As described earlier, beam 103a comprises a null facing in the originating direction of desired audio. For these embodiments, beam 103b comprises a null facing away from the originating direction of desired audio.

Figure 2G:
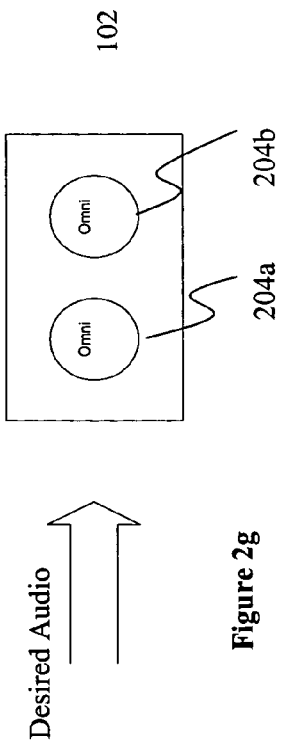

FIG. 2g illustrates yet another alternate two-element embodiment of acoustic device 102. For this embodiment, two omni-directional beam generating mics 204a and 204b are used instead. The two elements 204a and 204b are arranged to face the expected originating direction of desired audio in series. The arrangement is supplemented with the circuitry of FIG. 3 comprising delay 312, amplifier 314 and adder 316, implementing a "delay and sum" beam forming method.

As before, the responsive output of the second omni beam generating mic 204b provides beam 103b. However, beam 103a is formed by having a delay added to the responsive output of the first omni beam generating mic 204a, using delay 312, amplified using amplifier 314, and then subtracted from beam 103b.

The delay should be chosen so that the cardioid null is sufficiently deep across all frequency in the bandwidth. The two acoustic elements may be balanced by adjusting the gain of amplifier 314, to avoid mismatch and reduction of the null.

Figure 3:
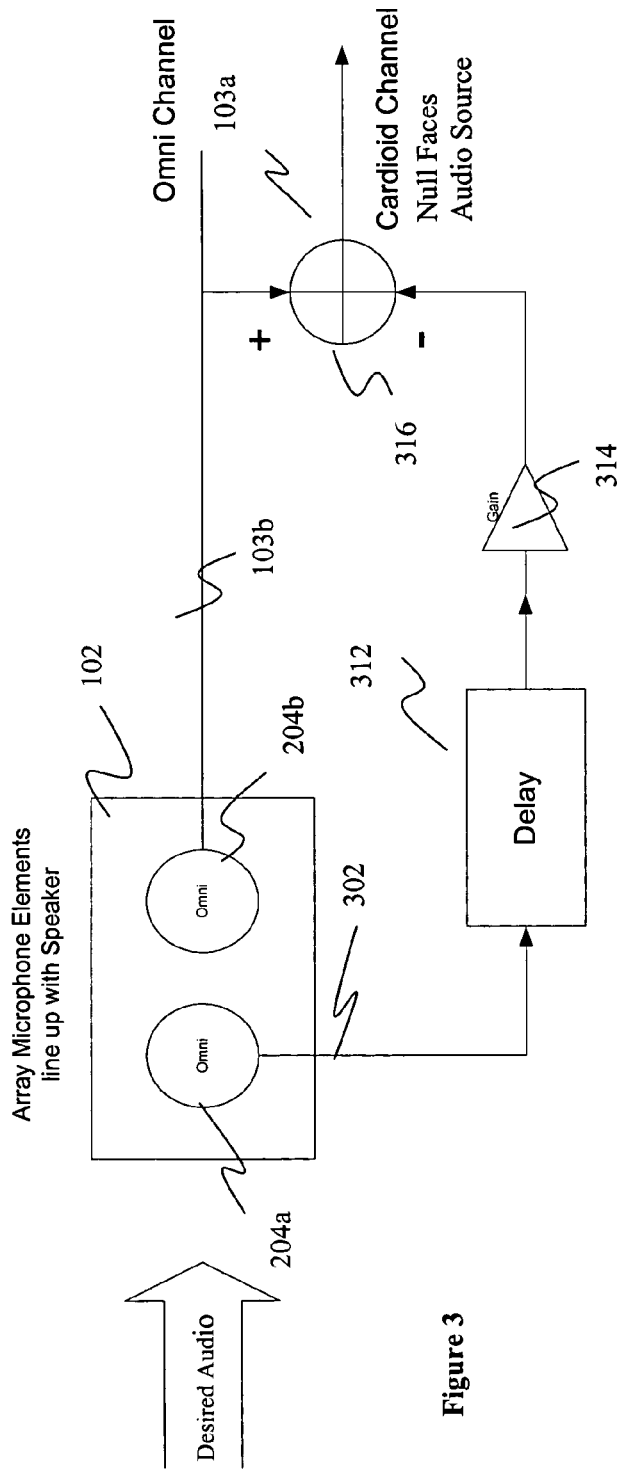
FIG. 3 illustrates supplemental logic suitable for use in conjunction with the acoustic device of FIG. 1 to generate the beam pattern of FIG. 2g, in accordance with one embodiment.

The circuitry of FIG. 3 may be integrally disposed as part of acoustic device 102, or it may be integrally disposed as part of signal processing subsystem 104. In yet other embodiments, the role of the two omni beam generating mic 204a and 204b may be reversed.

Additionally, in addition to the "no null" and "single face away null" shape of FIG. 4a and 4b, beam 103b may comprise two or more nulls, as long as none of the nulls is facing the originating direction of desired audio.

Figure 4C:
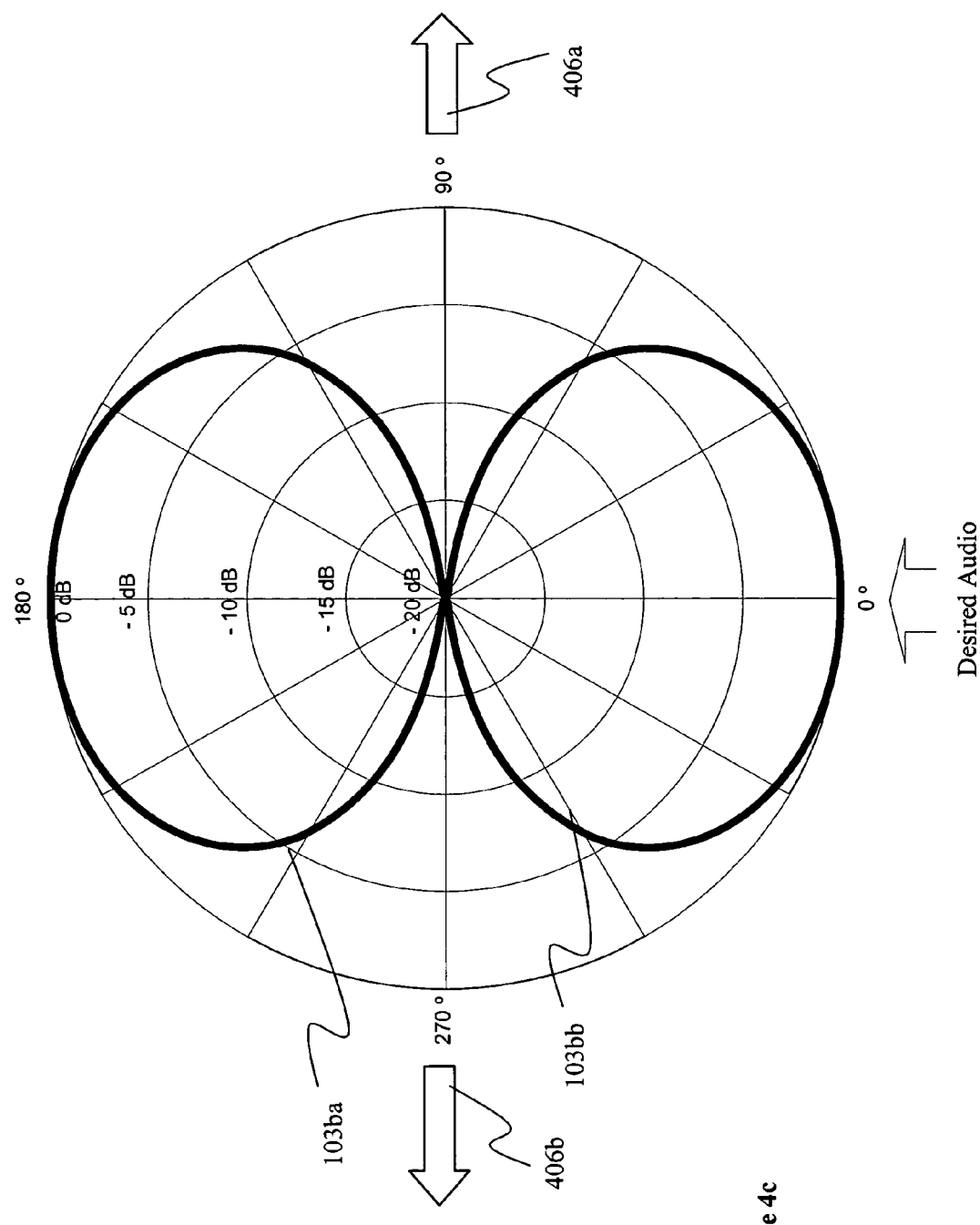
FIGS. 4c-4d illustrate other possible primary signal beams in the form of polar sensitivity plots.
Figure 4D:
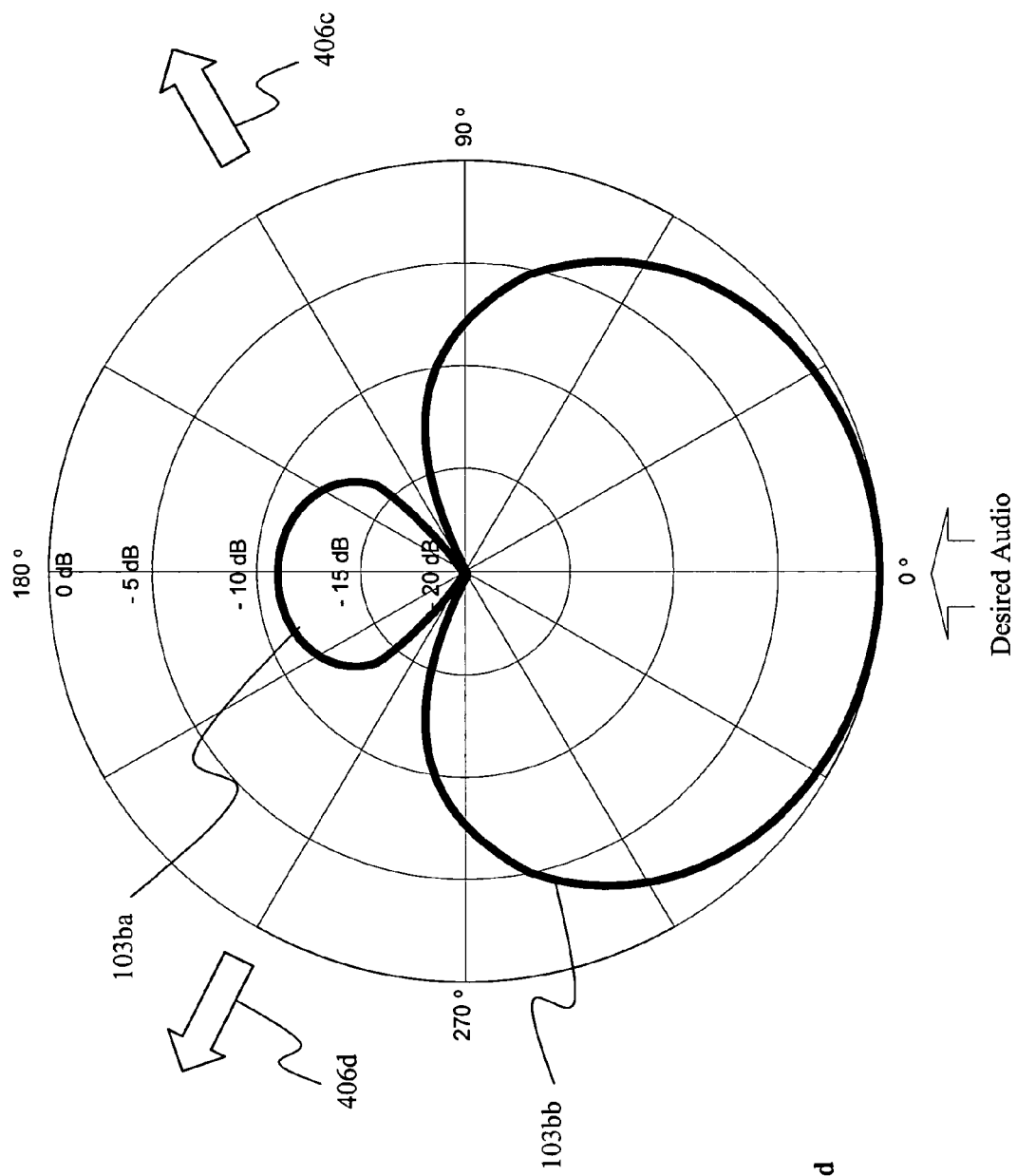

For example, FIG. 4c illustrates an alternate "clover leaf" beam shape (in a "polar sensitivity" plot) for beam 103b having two "leafs", forming two nulls, with the two nulls facing two directions 406a and 406b that are substantially orthogonal to the originating direction of desired audio. FIG. 4d illustrates yet another alternate "clover leaf" beam shape (in a "polar sensitivity" plot) for beam 103b having also two "leafs", forming two nulls, with the two nulls facing two directions 406c and 406d, each forming an obtuse angle with the originating direction of desired audio.

In summary, acoustic device 102 comprises two or more acoustic elements designed and arranged in a manner that facilitates generation of two signals with one signal comprising mostly undesired audio, substantially void of desired audio, and another signal comprising both desired and undesired audio. The two or more acoustic elements may e.g. respond to the presence of audio, desired and undesired, outputting a cardioid beam having a null facing the originating direction of desired audio, and another beam having any one of a number of complementary beam shapes (as long as it does not comprise a null facing the originating direction of desired audio).

Signal Processing Subsystem

Figure 5:
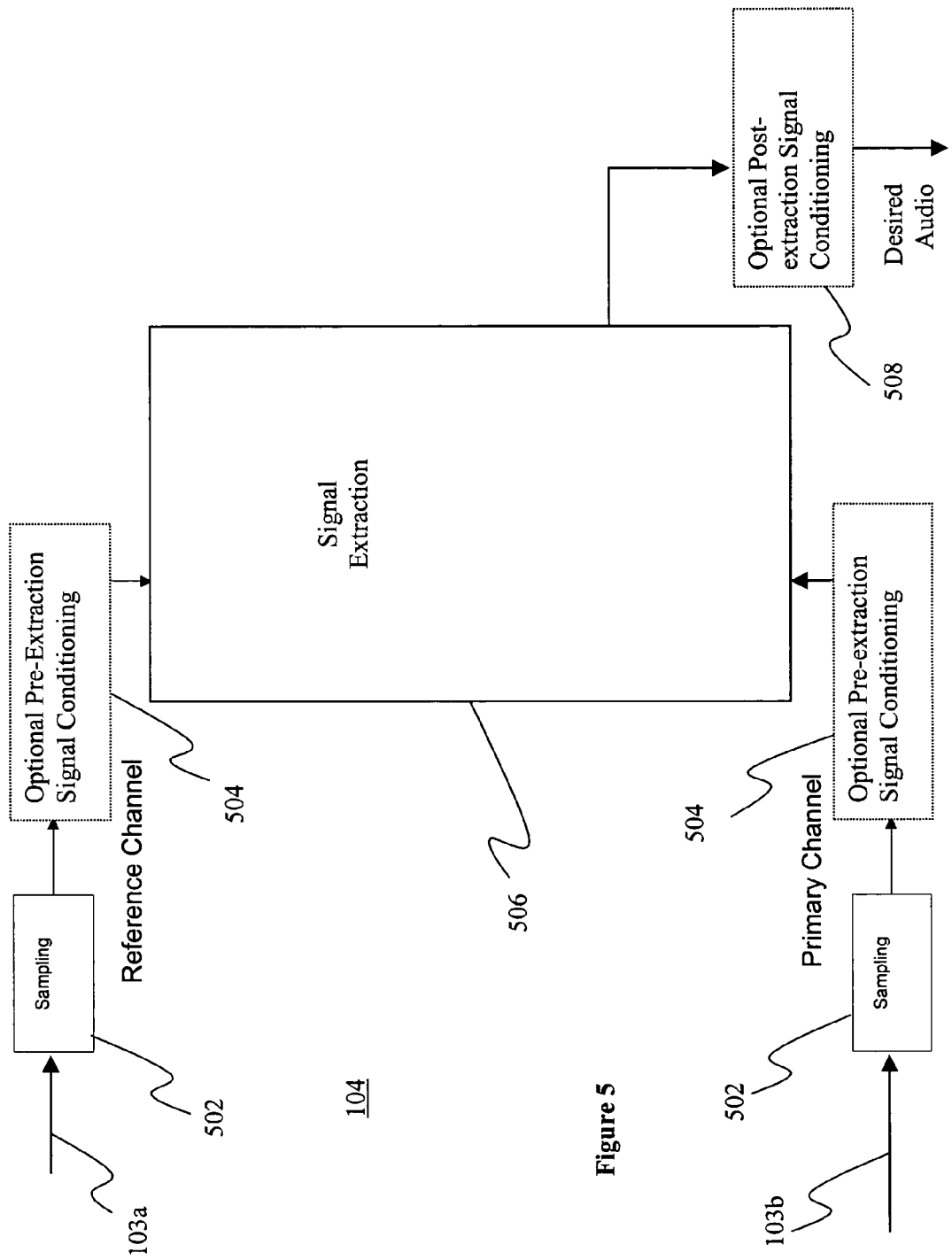
FIG. 5 illustrates the signal processing subsystem of FIG. 1 in further detail, in accordance with one embodiment.

FIG. 5 illustrates signal processing subsystem of FIG. 1 in further detail, in accordance with one embodiment. As illustrated, for the embodiment, signal processing subsystem 104 comprises two channels of input (labeled as "reference" and "primary"), sampling components 502, optional pre-extraction signal conditioning components 504, signal extraction component 506, and optional post-extraction signal conditioning component 508. The elements are coupled to each other as shown.

Reference channel is employed to receive beam 103a, whereas primary channel is employed to receive beam 103b.

Sampling components 504 are employed to digitized beams 103a and 103b. Typically, they are both digitized synchronically at the same sampling frequency, which is application dependent, and chosen according to the system bandwidth. In the case of ASR applications, the sampling frequency e.g. may be 8 kHz, 11 kHz, 12 kHz, or 16 kHz.

Typically, optional pre-extraction and post-extraction signal conditioning components 504 and 508 are application and/or extraction technique dependent. For example, in the case of ASR applications, and certain signal extraction techniques, such as echo cancellation like NLMS processing, pre-extraction and post-extraction signal conditioning components 504 and 508 may be pre-whitening and de-whitening filters. The pre-whitening and de-whitening filters are employed to level, and reverse the leveling of the spectrum density of both signals. Leveling of the spectrum density of both channels improve NLMS converging speed, for uneven frequency distribution of the signals. Other single channel noise cancellation technique, such as spectrum subtraction, can be added as additional stage of optional post extraction signal conditioning components.

Sampling Component

FIGS. 6a-6b illustrate the sampling component of FIG. 5 in further details, in accordance with two embodiments. For the embodiment of FIG. 6a, sampling component 502 comprises two AND converters 606, one each for the two beams 103a and 103b. Further sampling component 502 includes pre-amps 602 and anti-aliasing filters 604. The elements are coupled to each other as shown.

The signal from each acoustic element is amplified by a corresponding pre-amp 602, and then band-limited by a corresponding anti-aliasing filter 604, before being digitized by a corresponding A/D converter at the sampling frequency Fs.

FIG. 6b illustrates an alternate embodiment, where only one A/D converter 606 is used. However, sampling component 502 further includes sample and hold components 608 and multiplexor 610. The elements are coupled to each other as shown.

Each signal goes through the same processing as in FIG. 6a until after anti-aliasing filtering (using anti-aliasing filters 604), then it is sampled by sample-and-hold (S/H) unit 608 to produce a discreet signal. The output is then multiplexed (using multiplexor 610) with the discreet signal from the other channel. Finally, the multiplexed signal is digitized by A/D converter 606 into digital signal at twice the sampling frequency (2×Fs).

Pre-Whitening and De-Whitening

As described earlier, for certain acoustic applications, such as ASR applications, which tend to have stronger lower frequency components than higher frequency components, it may be desirable to perform pre-extraction conditioning of the signals, such as spectrum density leveling through pre-whitening filtering, and therefore, post-extraction reverse conditioning, such as reversing the spectrum density leveling through de-whitening filtering.

For these applications, a pre-whitening filter (also referred to as de-colorization filter) is placed on both the primary and reference inputs before they are sent to signal extraction component 506, in particular, if component 506 implements NMLS noise cancellation processing, to alleviate the potential slow convergence rate brought about by narrow band (highly auto-correlated) input signal.

One embodiment each of a pre-whitening filter, and a de-whitening filter is illustrated in FIGS. 7a and 7b respectively.

For the embodiment of FIG. 7a, pre-whitening filter 504 is in the form of a pre-emphasis filter characterized by the equation:

$$y_n = x_n - \alpha^* x_{n-1}$$

For the illustrated implementation, pre-whitening filter 504 includes storage elements 702 and 704 for storing the preceding input value, $x_{n-1}$, and the constant $\alpha$, and multiplier 706 as well as adder 708. The elements are coupled to each other as shown, and collectively operate to implement the processing to compute output $y_n$, per the above equation.

In alternate embodiment, pre-whitening filter 504 may also be implemented in software.

FIG. 7b illustrates the complementary de-whitening filter, in the form of a de-emphasis filter, characterized by the equation:

$$y_n = x_n + \alpha^* y_{n-1}$$

For the illustrated implementation, de-whitening filter 508 includes storage elements 722 and 724 for storing the preceding output value, $y_{n-1}$, and the constant $\alpha$, and multiplier 726 as well as adder 728. The elements are coupled to each other as shown, and collectively operate to implement the processing to compute output $y_n$, per the above equation.

Similarly, in alternate embodiment, de-whitening filter 508 may also be implemented in software.

Signal Extraction Component

Figure 8:
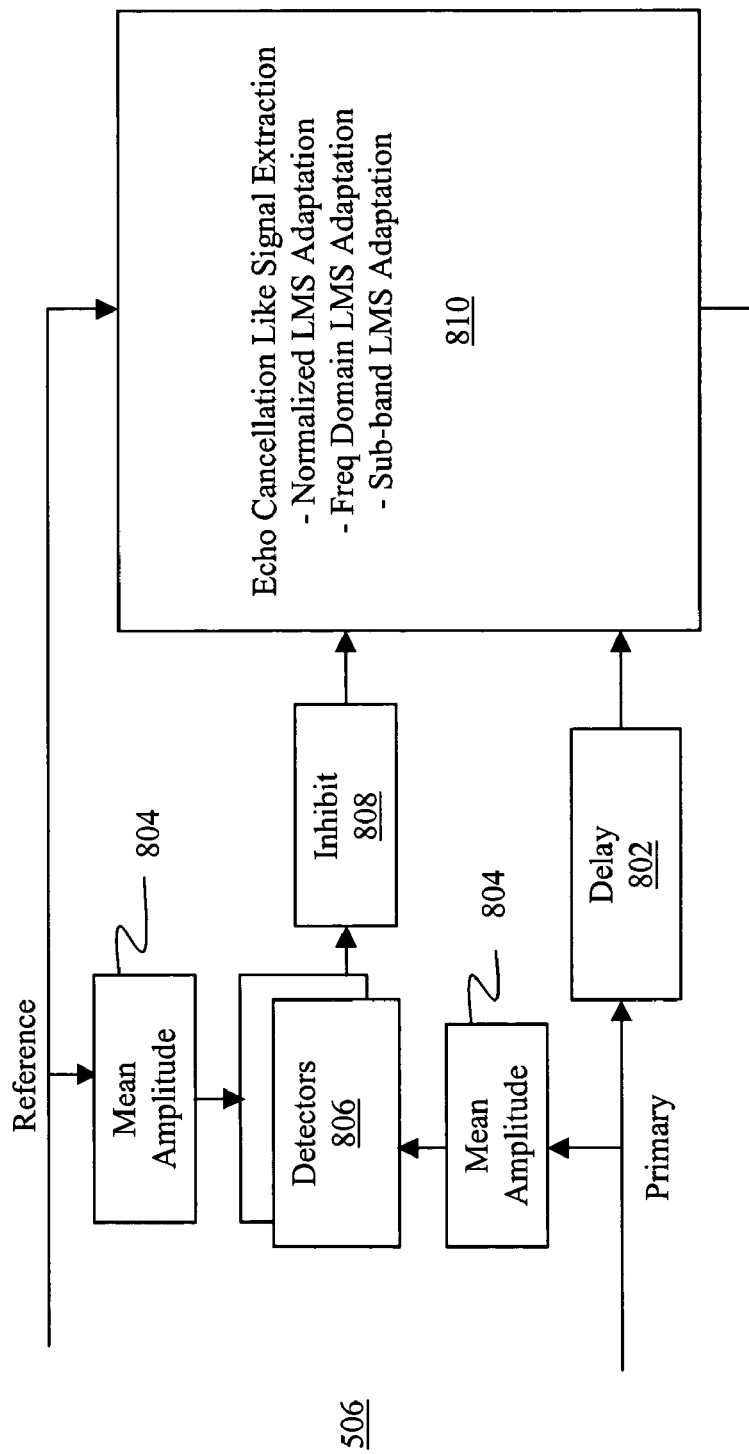
FIG. 8 illustrates the signal extraction component of FIG. 5 in further detail, in accordance with one embodiment.

FIG. 8 illustrates signal extraction component of FIG. 5 in further detail, in accordance with one embodiment. The embodiment implements an echo cancellation like technique to recover desired audio by removing the reference signal from the primary channel. The technique is referred to as "echo cancellation" like because similar to conventional "echo cancellation", one signal is subtracted from another. However, in classical "echo cancellation", the original signal that generates "echo" is accessible; and that original signal is not corrupted with the desired audio. Whereas under the present invention, the original noise signals are not available. Although the reference signal in the current invention is "substantially void of desired audio", it still contains some desired audio. Extra steps, such as inhibition, should be taken to avoid the cancellation of the desired signal. In classical "echo cancellation", it is the "echo" signal that is being subtracted from the composite signal with the desired audio and echo, and more importantly, the "echo" signal bears a natural deterministic time lagged relationship to the original audio that generated the echo. In contrast, under the present invention, it is the filtered reference signal, substantially void of the desired audio, being subtracted from the signal with both desired and undesired audio, and the reference and the desired signals are acquired virtually concurrently responsive to the presence of desired and undesired audio.

Accordingly, in addition to echo cancellation like logic 810, signal extraction component 506 includes in particular a delay element 802 to artificially introduce a deterministic delay to the signal formed based on beam 103*b* (i.e. the signal on the primary channel). This artificially introduced delay enables modeling of reverberation between the acoustic elements of acoustic device 102. Further, it enables adaptive FIR filters employed in the echo cancellation like signal processing technique to approximate a non-causal filter.

The amount of delay to be artificially introduced in order to model reverberation is application dependent. In general, it is approximately in the order of the duration of the impulse response of the environment. In various applications, the amount ranges from 30 ms-60 ms for automotive environment, and 100 ms-200 ms for an office environment.

For the embodiment, the echo cancellation like extraction of desired audio is actually conditionally operated, only when the channels are considered to be both active. Thus, beside signal extraction logic 810 and delay element 802, for the embodiment, signal extraction component 506 further includes mean amplitude estimation components 804, channel signal detectors 806 and inhibition logic 808. Channel signal detectors 806 are also collectively referred to as the "comparator" component, and in one embodiment, include in particular, two channel-active detectors, one each for the reference channel and the primary channel, and a desired audio detector. The elements are coupled to each other, and to the earlier enumerated elements as shown.

Mean amplitude estimator components 804 are employed to determine/estimate the power or amplitude of the signals of both channels for channel signal detectors 806, i.e. channel-active detector and desired audio detector, as well as for the echo cancellation like signal extraction process.

Figure 11A:
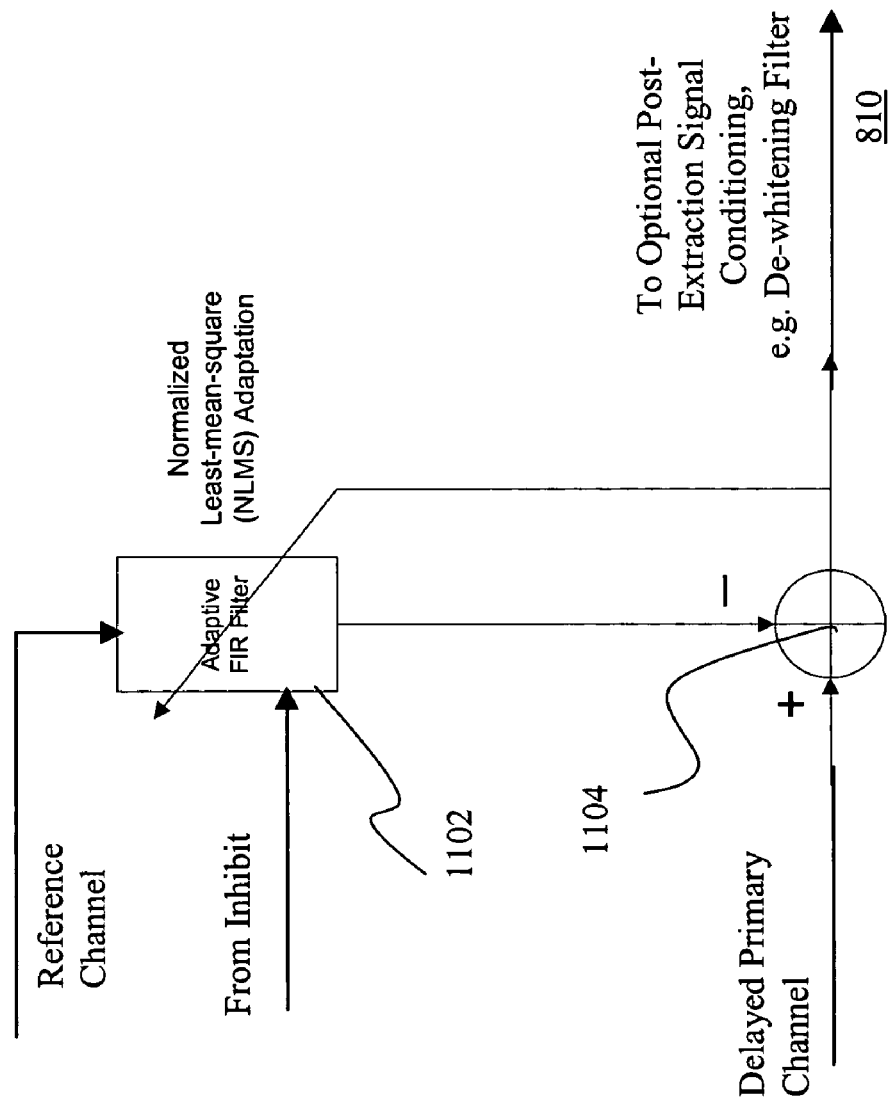
FIGS. 11a-11e illustrate the echo cancellation like logic of FIG. 8, in accordance with various embodiments.
Figure 11B:
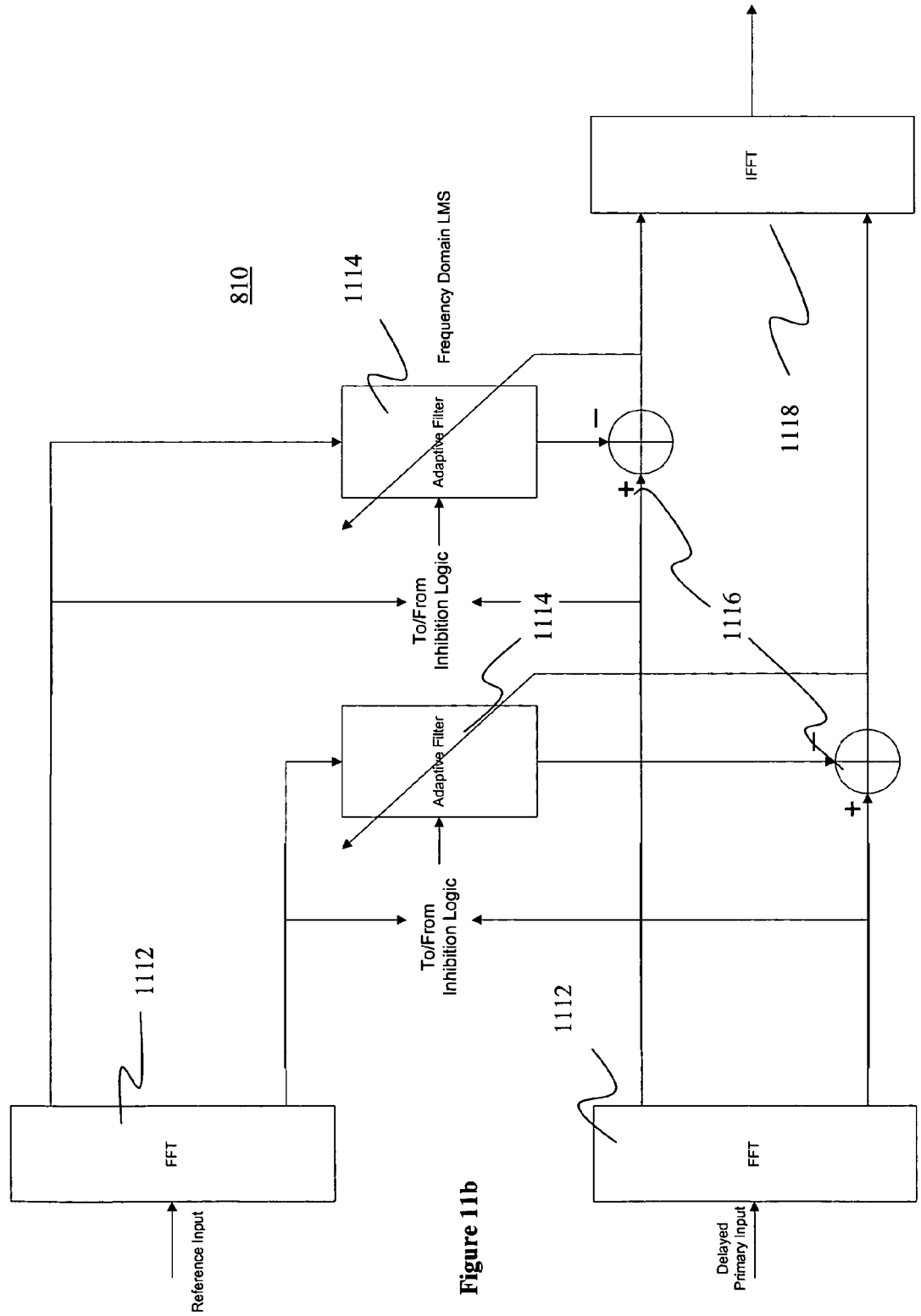
Figure 11C:
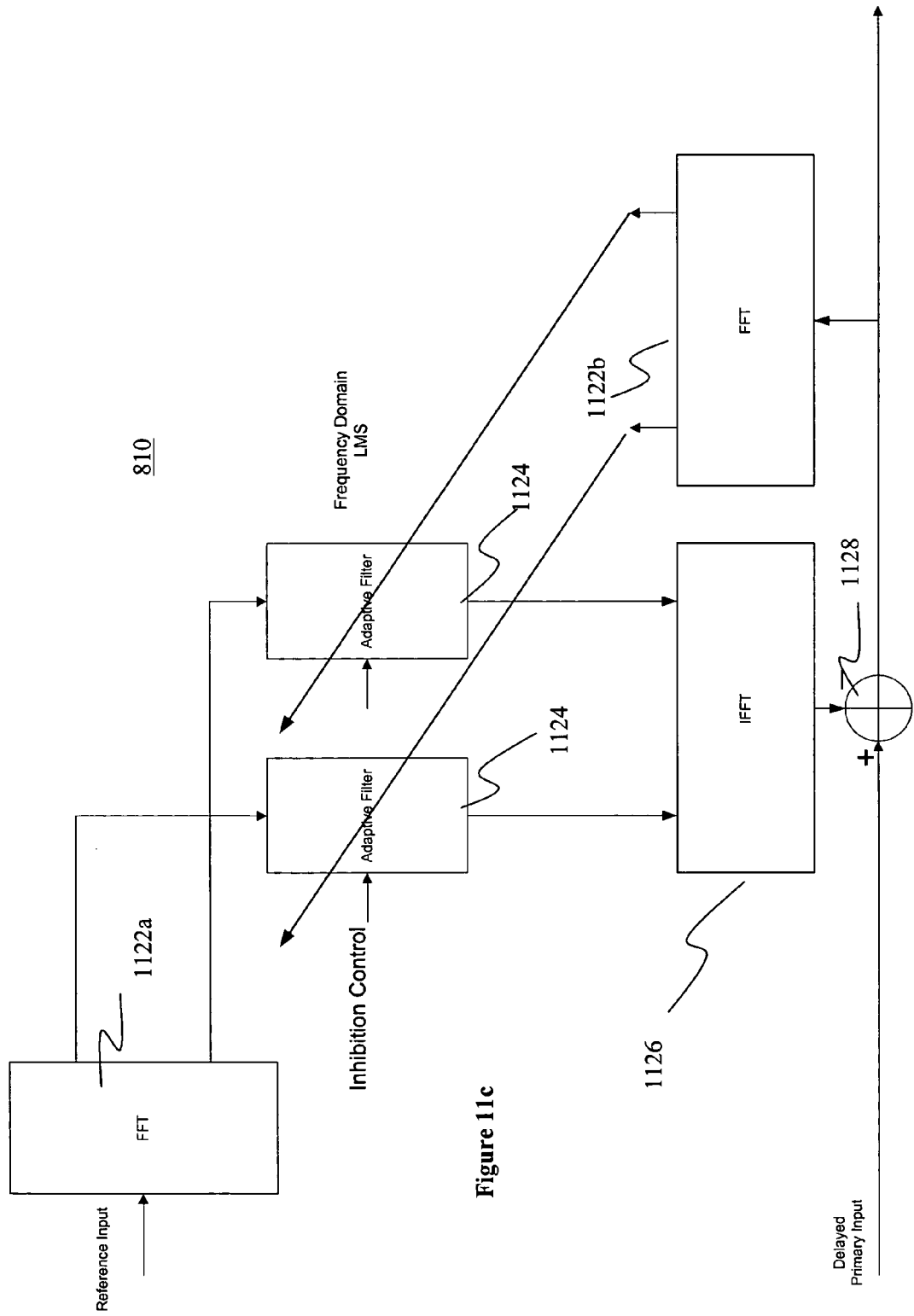
Figure 11D:
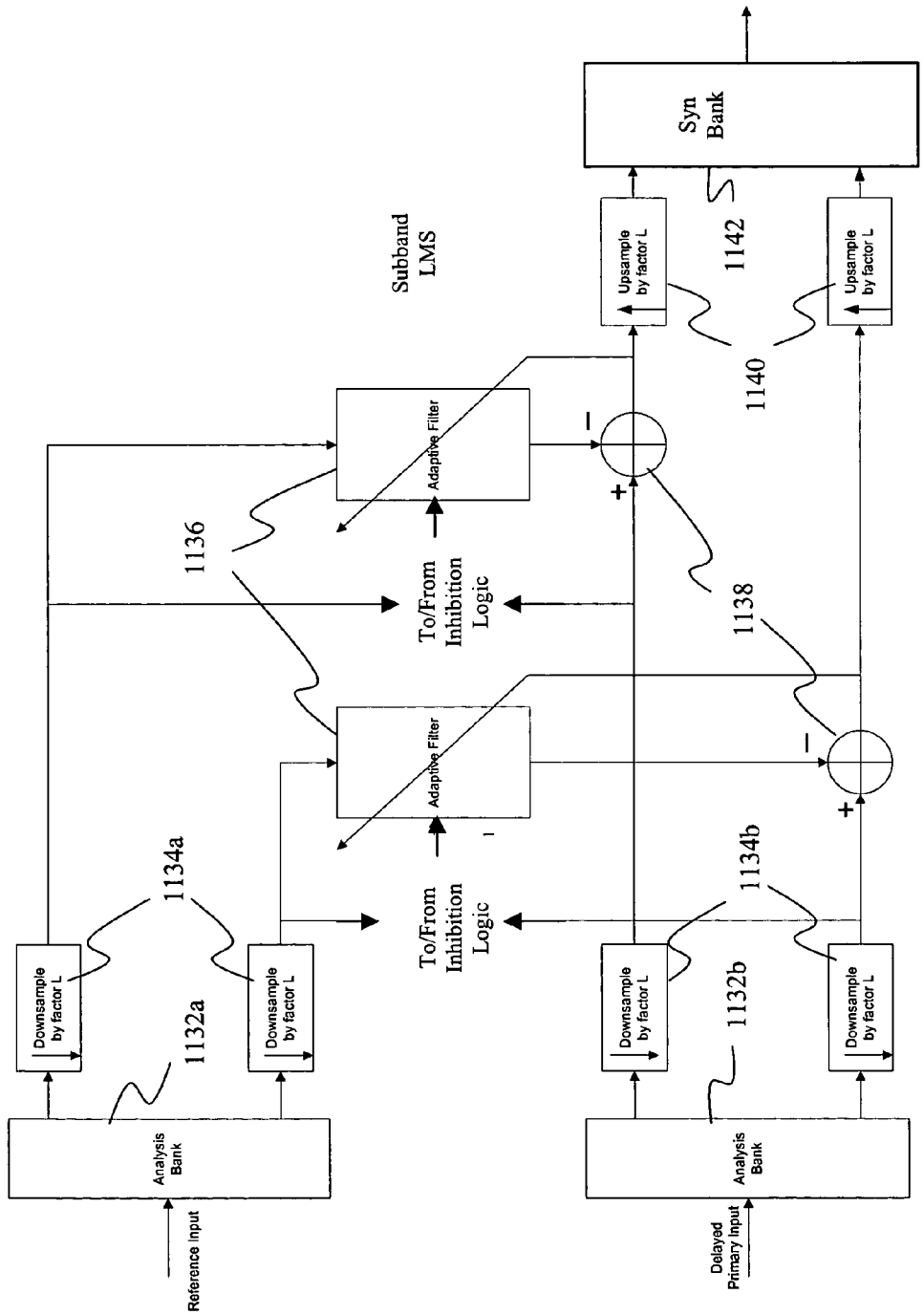
Figure 11E:
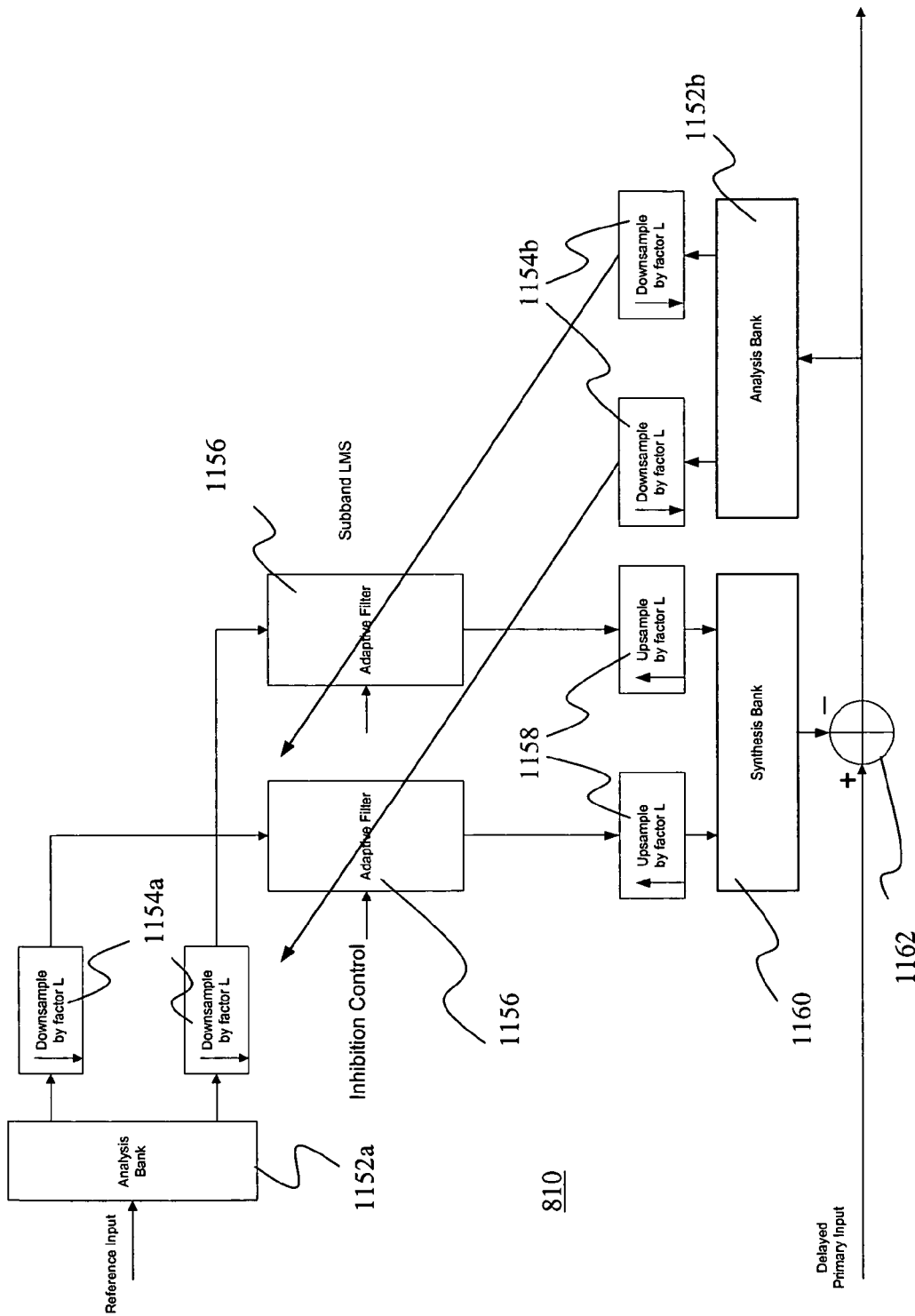

In one embodiment, the echo cancellation like signal extraction process implemented is an adaptive noise cancellation process employing a NLMS FIR filter (FIG. 11*a*). In other embodiments, the echo cancellation like signal extraction processes implemented are adaptive noise cancellation processes employing a number of frequency domain LMS filters (FIG. 11*b*-11*c*). In yet other embodiments, the echo cancellation like signal extraction processes implemented are adaptive noise cancellation processes employing a number subband LMS filter (FIG. 11*d*-11*e*).

These elements are further described in turn below.

Mean Amplitude Estimator

Figure 9:
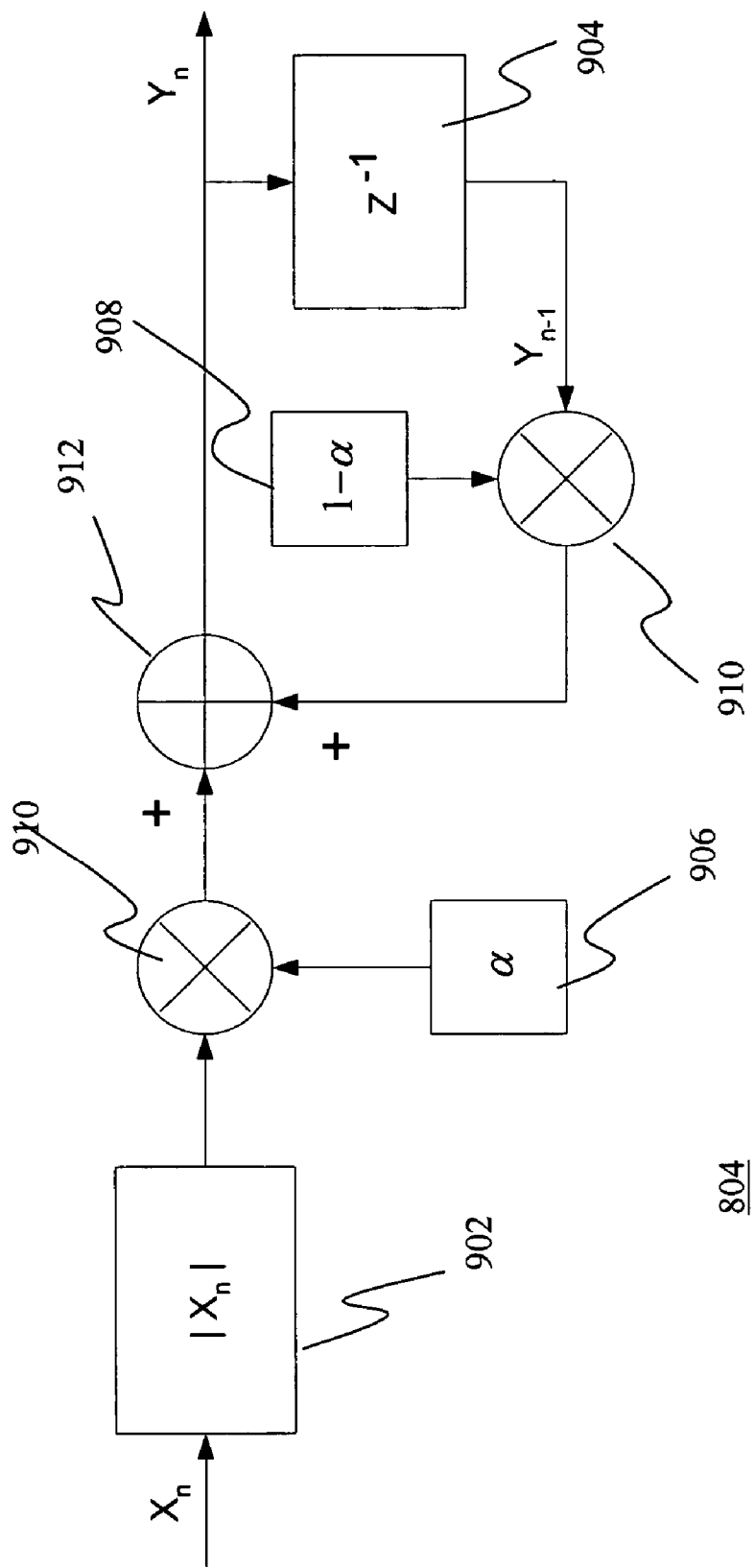
FIG. 9 illustrates the mean amplitude computation component of FIG. 8 in further detail, in accordance with one embodiment.

FIG. 9 illustrates the mean amplitude estimation component of FIG. 8 in further detail, in accordance with one embodiment. For the embodiment, mean amplitude estimation component 804 calculates a weighted running average of the absolute value of the input as characterized by the equation:

$$y_n = (1-\alpha) * y_{n-1} + \alpha * |x_n|$$

The weight coefficient determines the length of the running window.

The embodiment includes various storage elements 902-908 for storing the values of $|x_n|$, $y_{n-1}$, $\alpha$, and $(1-\alpha)$ respectively, and multipliers 910 and adder 912 to perform the computations.

As with the earlier described pre-whitening and de-whitening components, mean amplitude estimation component 804 may also be implemented in software.

Detectors

Figure 10A:
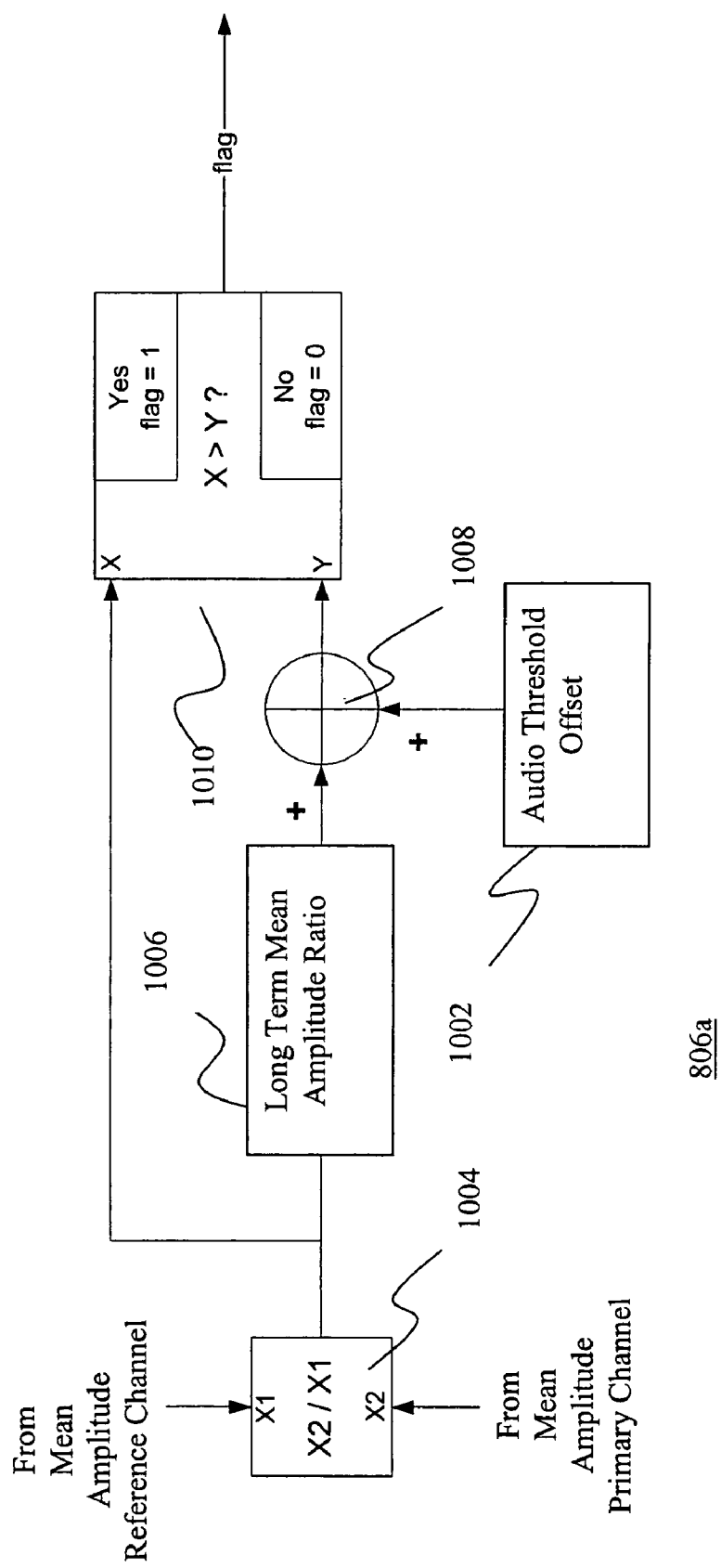
FIGS. 10a-10b illustrate the detector components of FIG. 8 in further details, in accordance with two embodiments.
Figure 10B:
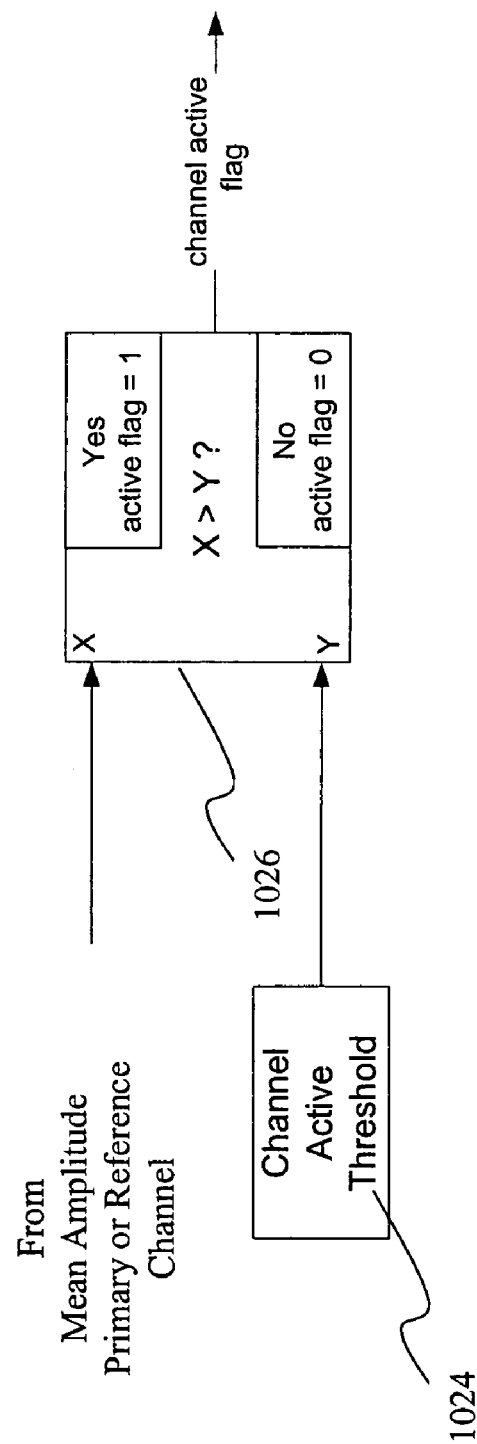

FIGS. 10*a*-10*b* illustrate the comparator component, i.e. detectors, of FIG. 8 in further detail, in accordance with one embodiment. More specifically, FIG. 10*a* shows the logic of a desired audio detector 806*a*, whereas FIG. 10*b* shows the logic of a channel active detector 806*b*.

For the illustrated embodiment, desired audio detector 806*a* includes storage element 1002 for storing an audio threshold offset. Additionally, desired audio detector 806*a* further includes ratio calculator 1004, long term running mean amplitude ratio value calculator 1006, adder 1008 and comparator 1010. The elements are coupled to each other as shown. The embodiment is a power based detector.

Ratio calculator 1004 is employed to calculate the ratio of the primary and reference signal mean amplitude. Running mean amplitude ratio calculator 1006 is employed to calculate the long term running mean value of the ratio, which provides the base or floor for the desired audio. Comparator 1010 and adder 1008 are employed to compare the current ratio to determine whether it is greater than the long term running ratio by at least a threshold offset. If it is above the base by at least the threshold offset, desired audio is considered detected; otherwise no desired audio is assumed.

The embodiment is designed for desired audio that tends to exhibit a bursty characteristic, such as speech. For other audio applications, suitably modified embodiments may be employed instead.

In alternate embodiments, other desired audio detectors, e.g. correlation based desired signal detector, may be employed instead. FIG. 10*b* shows a channel-active detector in further detail, in accordance with one embodiment. The embodiment is a power based comparator. As illustrated, channel-active detector 806*b* comprises storage element 1024 for storing a threshold value, and comparator 1026 for comparing the mean amplitude of the channel to the stored threshold value. If it's above the stored threshold value, the channel is assumed to be active; otherwise the channel is assumed to be inactive.

Further, as with the earlier described pre-whitening/de-whitening and mean amplitude estimation components, detectors 804*a*-804*b* may also be implemented in software.

Inhibit

Figure 12:
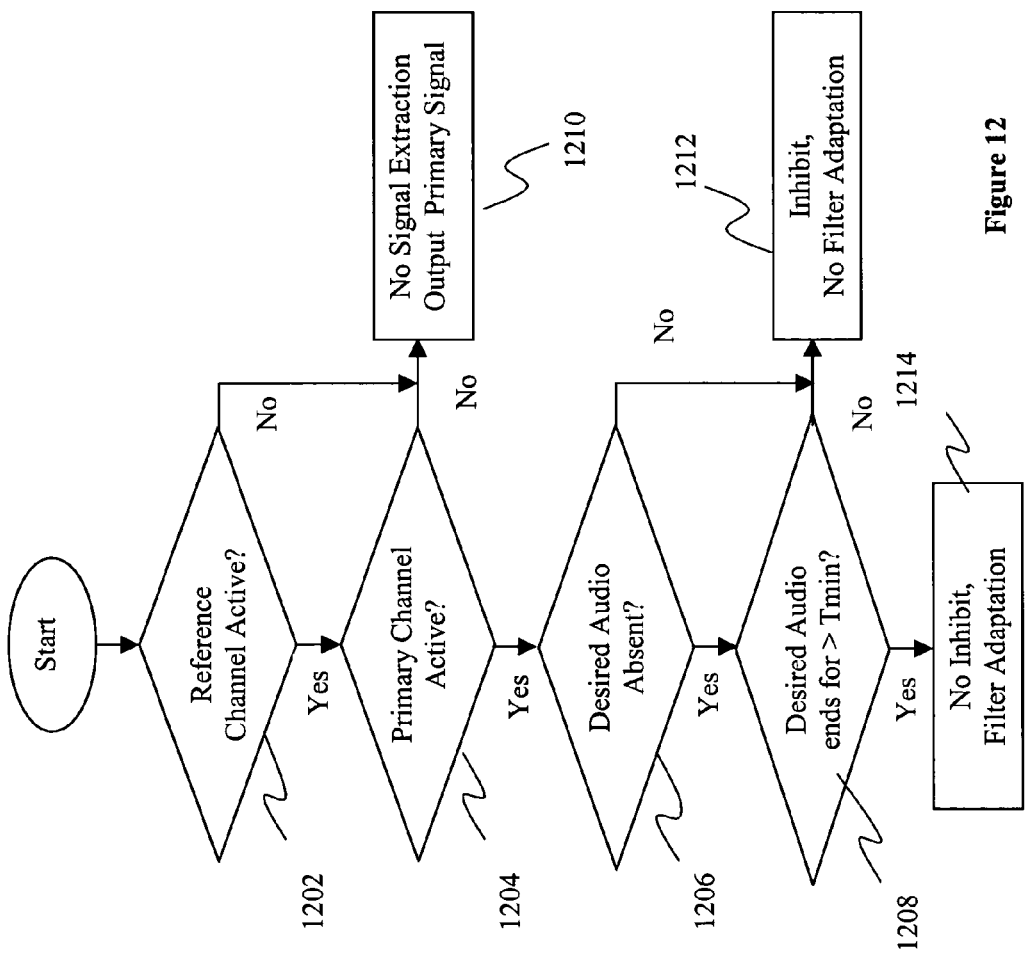
FIG. 12 illustrates the operational logic of the inhibitor component of FIG. 8, in accordance with one embodiment.

FIG. 12 illustrates the operating logic of the inhibit component of FIG. 8 in further details, in accordance with one embodiment. As illustrated, for the embodiment, designed for time domain implementation, inhibit component 808 using the inputs provided detectors 806 first determines whether both the primary and the reference channels are active, blocks 1202-1204. If either the primary or the reference channel is determined to be inactive, the inhibit signal is set to "positive", resulting in substantial inoperation of the signal extraction block (e.g. to conserve computing power), i.e. no signal extraction (filtering) or adjustment to the extraction (adaptation) is performed. Under the condition, for the embodiment, whatever signal is present on the primary channel is outputted, block 1210.

However, if both channels are active, inhibit logic 808 further determines if either desired audio is present or a pause threshold (also referred to as hangover time) has not been reached, block 1206-1208. The pause threshold (or hangover time) is application dependent. For example, in the case of ASR, the pause threshold may be a fraction of a second.

If the desired audio is detected or the pause time is not exceeded, the inhibit signal is set to "positive with filter adaptation disabled", i.e. filtering coefficients frozen, block 1212. The reference signal is filtered accordingly, and subtracted from the primary channel to generate desired audio.

If the desired audio is not detected, and the pause time is exceeded (but the channels are active), the inhibit signal is set to "negative with filter adaptation enabled", block 1214. Under the condition, the filtering coefficients of the employed filters will be adapted.

Note that the above described embodiment advantageously employs the detectors and inhibition before the primary signal (having the desired audio) delay, thus the likelihood of the desired audio negatively impacting the filter adaptation operation is reduced.

As alluded to earlier, described in more detail below, filtering may also be performed in the frequency and subband domains. For these embodiments, the above inhibit implementation may be practiced on a frequency by frequency or subband by subband basis.

Echo Cancellation Like Signal Extraction Component

FIGS. 11a-11e illustrate echo cancellation like signal extraction component of FIG. 8 in further detail, in accordance with various embodiments. More specifically, FIG. 11a illustrates an implementation employing a NLMS adapted approach, whereas FIGS. 11b-11c illustrate two implementations employing a frequency domain LMS adapted approach. FIG. 11d-11e illustrate two implementations employing a subband LMS adapted approach.

As illustrated in FIG. 11a, echo cancellation like signal extraction component 810 of the NLMS adaptive implementation comprises adaptive FIR filter 1102 and adder 1104. The elements are coupled to each other as shown.

The (conditioned) signal of the reference channel is filtered by adaptive FIR filter 1102, and subtracted from the delayed signal of the primary channel, using adder 1104. The result is outputted as the desired audio.

The extraction logic operates as a loop running on a sample-by-sample basis. The reference signal is filtered by the adaptive FIR filter 1102. Essentially, a transfer function is applied to the reference channel to model the acoustic path from the cardioid element to the other element, so that the filtered reference signal closely matches the noise component of the signal in the primary channel. The filtered reference signal is then subtracted from the delayed primary signal. What is left, is the desired audio.

The output of the NLMS is also called the NLMS error; it is used to adjust the adaptive FIR filter coefficients so that the NLMS error will be minimized when the desired audio is not present.

As illustrated in FIG. 11b, echo cancellation like signal extraction component 810 of the first frequency LMS implementation comprises FFT components 1112, a number of adaptive filters 1114 (two shown), a number of adders 1116 (two shown) and IFFT component 1118. The elements are coupled to each other as shown.

The (conditioned) signals of the reference channel and the delayed primary channel are first "decomposed" into a number of frequency components (two shown), by the corresponding FFT components 1112. Each of the frequency components of the reference signal is filtered by a corresponding adaptive filter 1114, and subtracted from the corresponding frequency component of the delayed signal of the primary channel, using a corresponding adder 1116. The resulted frequency components are "recombined", using IFFT component 1118, and the recombined signal is outputted as the desired audio.

As illustrated in FIG. 11c, echo cancellation like signal extraction component 810 of the second frequency LMS implementation comprises FFT components 1122a-1122b, a number of adaptive filters 1124 (two shown), adder 1128 and IFFT component 1126. The elements are coupled to each other as shown.

The (conditioned) signal of the reference channel is first "decomposed" into a number of frequency components (two shown), by FFT component 1122a. Each of the frequency components of the reference signal is filtered by a corresponding adaptive filter 1124. The filtered frequency components are recombined into a filtered reference signal, using IFFT component 1126, which is then subtracted from the delayed signal of the primary channel, using adder 1128, to generate desired audio.

The error signal (comprising the desired audio, if present) is also "decomposed" into a number of frequency components, using FFT component 1122b, and the "decomposed" frequency components are used to adapt filters 1124.

As illustrated in FIG. 11d, echo cancellation like signal extraction component 810 of the first subband LMS implementation comprises analysis banks 1132a-1132b, a number of down-sampling units 1134a-1134b (two sets of two shown), a number of adaptive filters 1136 (two shown), a number of adders 1138 (two shown), a number of up-sampling units 1140 (two shown), and a synthesis bank 1142. The elements are coupled to each other as shown.

The (conditioned) signals of the reference channel and the delayed primary channel are first "decomposed" into a number of subband components (two shown), by the corresponding analysis banks 1132a/1132b. Each of the subband components of the reference signal is first down-sampled by a predetermined factor, using a corresponding down-sampling unit 1134, and then filtered by a corresponding adaptive filter 1136. Each of the filtered subband components is then subtracted from the corresponding subband component of the delayed signal of the primary channel, using a corresponding adder 1138. The resulted subband components are up-sampled by the same factor, using a corresponding up-sampling unit 1140, and then "recombined", using synthesis bank 1142. The recombined signal is outputted as the desired audio.

As illustrated in FIG. 11e, echo cancellation like signal extraction component 810 of the second subband LMS implementation comprises analysis banks 1152a-1152b, a number of down-sampling units 1154a and 1154b (two sets of two shown), a number of adaptive filters 1156 (two shown), a number of up-sampling units 1158 (two shown), synthesis bank 1160 and adder 1162. The elements are coupled to each other as shown.

The (conditioned) signal of the reference channel is first "decomposed" into a number of subband components (two shown), by analysis bank 1152a. Each of the subband components of the reference signal is down sampled by a predetermined factor, using a corresponding down sampling unit 1154a, and then filtered by a corresponding adaptive filter 1156. The filtered subband components are up-sampled by corresponding up-sampling units 1158, and then recombined into a filtered reference signal, using synthesis bank 1160, which is then subtracted from the delayed signal of the primary channel, using adder 1162, to generate desired audio.

The error signal (comprising the desired audio, if present) is also "decomposed" into a number of subband components, using analysis bank 1152b and down sampling unit 1154b, and the "decomposed" subband components are used to adapt filters 1156.

Each of these signal extraction component embodiments may also be implemented in software.

Blind Signal Separation

Figure 13:
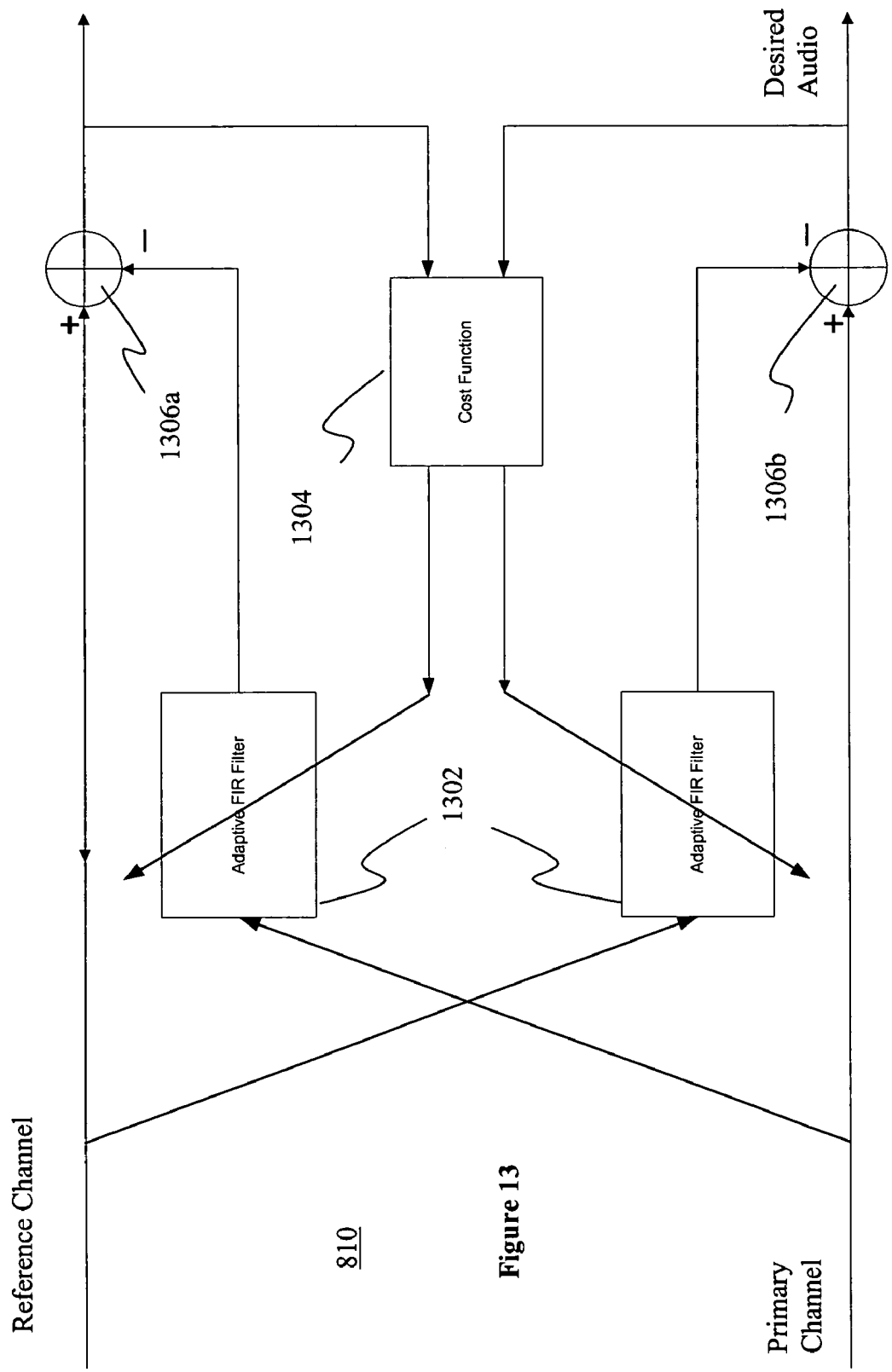
FIG. 13 illustrates the signal extraction logic of FIG. 5, in accordance with another embodiment.

FIG. 13 illustrates signal extraction component 506 of FIG. 5 in further detail, in accordance with another embodiment. As opposed to the earlier described echo cancellation like embodiments, signal extraction component 506 of FIG. 13 implements a blind signal separation technique to remove the signal of the reference channel from the signal of the primary channel to extract desired audio.

As illustrated, signal extraction component 810 comprises a number of adaptive FIR filters 1302, adders 1306 and a cost function 1304. The elements are coupled to each other as shown.

Both the reference and the primary channels are filtered using adaptive FIR filters 1302. The results are subtracted from each other using corresponding adders 1306. The resulted signals are outputted, with the result of the reference signal having been subtracted from the primary signal being the desired audio.

The output signals are in turn feedback to a cost function, which outputs respective adaptation for adaptive FIR filters 1302 based on the two output signals. The cost function depends on specific BSS method.

Conclusion and Epilogue

Thus, it can be seen from the above descriptions, various novel acoustic devices, systems and methods have been described.

While the present invention has been described in terms of the above described embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A system, comprising:
an acoustic device having a plurality of acoustic elements designed and arranged to facilitate generation of a first signal that includes mostly undesired audio, substantially void of desired audio;
a second signal that includes both the desired and the undesired audio; and a signal processing subsystem coupled to the acoustic device to extract the desired audio using the first and second signals;
wherein said signal processing subsystem comprises a signal separation component eguipped to subtract the first signal from the second signal;
wherein said signal processing subsystem further comprises a delay component to introduce a deterministic delay to said second signal;
wherein said signal separation component comprises logic to employ an echo cancellation like technique to subtract the first signal from the second signal;
wherein said signal processing subsystem further comprises an inhibit component to inhibit said signal separation component from performing at least one of signal filtering and adapting filtering; and
wherein said signal processing subsystem further comprises a plurality of mean amplitude estimators and a comparator coupled to each other and to said inhibit component to provide said inhibit component with inputs for determining whether to inhibit said signal separation component from performing at least one of signal filtering and adapting filtering.

2. A system, comprising:
an acoustic device having a plurality of acoustic elements designed and arranged to facilitate generation of a first signal that includes mostly undesired audio, substantially void of desired audio,
a second signal that includes both the desired and the undesired audio; and a signal processing subsystem coupled to the acoustic device to extracted the desired audio using the first and second signals;
wherein said signal processing subsystem comprises a signal separation component equipped to subtract the first signal from the second signal;
wherein said signal processing subsystem further comprises a delay component to introduce a deterministic delay to said second signal;
said signal separation component comprises logic to employ an echo cancellation like technique to subtract the first signal from the second signal; and
wherein said desired audio is desired speech, and said signal processing subsystem further comprises a first and a second pre-whitening component coupled to the delay and the signal separation component respectively, and a de-whitening component coupled to said signal separation component, to condition said first and second signals prior to extracting desired audio from the signals, and the re-condition the extracted desired audio.

3. A signal extraction method comprising:
generating a first signal that includes mostly undesired audio, substantially void of desired audio, and a second signal that includes both the desired and the undesired audio;
extracting the desired audio using the first and second signals;
wherein said extracting comprises subtracting the first signal from the second signal;
wherein said extracting further comprises introducing a deterministic delay to said second signal;
said subtracting comprises subtracting the first signal from the second signal employing an echo cancellation like technique;
wherein said echo cancellation like technique comprises performing a selected one of normalized time domain, freguency domain and sub-band least-mean-square adaptive filtering operations on the first and second signals;
wherein said method further comprises conditioning inhibiting at least one of said filtering and adapting said filtering; and
wherein the method further comprises computing mean amplitude estimations for the signals, comparing the estimated mean amplitudes, and providing the comparison results for said conditional inhibition.

* * * * *